(12) United States Patent
Shirakawa

(10) Patent No.: US 7,164,334 B2
(45) Date of Patent: Jan. 16, 2007

(54) ELECTROSTATIC ACTUATOR, MICROSWITCH, MICRO OPTICAL SWITCH, ELECTRONIC DEVICE, AND METHOD OF MANUFACTURING ELECTROSTATIC ACTUATOR

(75) Inventor: Kazuhiko Shirakawa, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 32 days.

(21) Appl. No.: 10/884,527

(22) Filed: Jul. 2, 2004

(65) Prior Publication Data
US 2005/0001701 A1    Jan. 6, 2005

(30) Foreign Application Priority Data
Jul. 2, 2003    (JP)    ............................. 2003-190611

(51) Int. Cl.
*H01H 51/22*    (2006.01)
(52) U.S. Cl. ........................................ 335/78; 200/181
(58) Field of Classification Search .................. 335/78; 200/181
See application file for complete search history.

(56) References Cited

U.S. PATENT DOCUMENTS

| | | | | |
|---|---|---|---|---|
| 5,638,946 | A | * | 6/1997 | Zavracky .................... 200/181 |
| 6,069,540 | A | * | 5/2000 | Berenz et al. ............... 333/101 |
| 6,777,629 | B1 | * | 8/2004 | Lane et al. .................. 200/181 |
| 2005/0219017 | A1 | * | 10/2005 | Shirakawa ................... 335/78 |

FOREIGN PATENT DOCUMENTS

JP    2002-287045    10/2002

OTHER PUBLICATIONS

"Current Situation of MEMS Technology and Its Problems," Technology Evaluation and Research Report (Technology Trend) No. 3, Published Mar. 28, 2003, issued by Ministry of Economy, Trade, and Industry, Industrial Science and Technology Policy and Environmental Bureau, Technology Evaluation and Research Division, Manufacturing Industries Bureau, Industrial Machinery Division.

* cited by examiner

*Primary Examiner*—Elvin Enad
*Assistant Examiner*—Bernard Rojas
(74) *Attorney, Agent, or Firm*—David G. Conlin; Steven M. Jensen; Edwards Angell Palmer & Dodge LLP

(57) ABSTRACT

The present switch including the present actuator has a supporting column on a substrate, and a cap plate provided on the supporting column. The supporting column pivotally supports the cap plate. At ends of the cap plate, a plurality of beams are provided, respectively. The plurality of beams are subjected to electrostatic force of absorbing electrodes. According to the present switch, tilting directions of the cap plate (beams) can be set freely. Therefore, by providing the beams in a plurality of directions desired by a user and positioning the absorbing electrodes on the substrate so that the absorbing electrodes respectively correspond to the beams, the cap plate can be tilted in a plurality of desired directions. With this arrangement, the present switch has high degree of freedom as to the positions and number of substrate contact points.

12 Claims, 17 Drawing Sheets

US 7,164,334 B2

ELECTROSTATIC ACTUATOR, MICROSWITCH, MICRO OPTICAL SWITCH, ELECTRONIC DEVICE, AND METHOD OF MANUFACTURING ELECTROSTATIC ACTUATOR

This nonprovisional application claims priority under 35 U.S.C. § 119(a) on Patent Application No. 2003/190611 filed in Japan on Jul. 2, 2003, the entire contents of which are hereby incorporated by reference.

FIELD OF THE INVENTION

The present invention relates to an electrostatic actuator in which absorbing electrodes provided on a substrate electrostatically attract a rocking plate.

BACKGROUND OF THE INVENTION

As described in publication 1, MEMS (Micro Electro Mechanical Systems) are devices into which a variety of mechanical, electronic, optical, chemical, and other functions are integrated by semiconductor micro fabrication technology (semiconductor processing) or the like.

Currently, the MEMS are used to develop microswitches (switches in micro size) using an electrostatic actuator.

One example of such a microswitch is disclosed in publication 2. FIGS. 28 and 29 are explanatory diagrams illustrating the switch of publication 2.

As shown in FIGS. 28 and 29, the microswitch has a seesaw-type structure. The microswitch has a column (supporting leg) 84 and a beam 81. The column 84 is provided at a center of the microswitch. The beam 81 has a narrow-plate shape, and is provided with electrodes respectively at both ends.

On such parts of the substrate as to respectively oppose both ends of the beam 81, absorbing electrodes (electrostatic force applying electrodes) 82 and substrate contact points 83 are provided. When an electric field is applied to one of the absorbing electrodes 82, the beam 81 is absorbed to the substrate. In this way, switching operation for connecting one of the electrodes of the beam 81 and one of the substrate contact points 83 is performed.

Thus, the seesaw-type structure of the microswitch allows for driving the beam 81 at a low voltage.

However, according to the microswitch of publication 2, the beam 81 (which has a narrow-plate shape) can only perform up-and-down movement, using the column 84 as an axis of rotation. Therefore, the microswitch of publication 2 has a drawback that the substrate contact points 83 can be provided only in two directions along which the beam 81 extends.

Publication 1: "Current Situation of MEMS Technology and Its Problems", *Technology Evaluation and Research Report* (*Technology Trend*), No. 3 (published on Mar. 28, 2003 by Ministry of Economy, Trade, and Industry, Industrial Science And Technology Policy and Environment Bureau, Technology Evaluation and Research Division, Manufacturing Industries Bureau, Industrial Machinery Division)

Publication 2: Japanese Publication for Unexamined Patent Application, Tokukai 2002-287045 (publication date: Oct. 3, 2002)

SUMMARY OF THE INVENTION

The present invention was made to solve the foregoing conventional problem. An object of the present invention is therefore to provide an electrostatic actuator that can form a microswitch with high degree of freedom as to positions and number of substrate contact points.

To attain the foregoing object, an electrostatic actuator of the present invention (hereinafter "the present actuator") is an electrostatic actuator in which absorbing electrodes provided on a substrate electrostatically attract a rocking plate, the electrostatic actuator including: a supporting column fixed on the substrate, the supporting column pivotally supporting the rocking plate; and a plurality of beams provided at respective ends of the rocking plate so as to be subjected to electrostatic force of the absorbing electrodes.

The present actuator is an electrostatic actuator (electrostatic driving microactuator), which is a MEMS technology. The electrostatic actuator is a structure that moves a movable section (the rocking plate) by means of electrostatic force.

Thus, the present actuator has the rocking plate provided above the substrate, and has the absorbing electrodes provided on a surface of the substrate so as to generate electrostatic force. The absorbing electrodes attract (tilt) the rocking plate to the substrate by means of the electrostatic force (attracting force) thereof. In this way, a switching function or the like function is attained.

In particular, the present actuator has the supporting column on the substrate, and the rocking plate is provided on the supporting column so that the rocking plate is pivoted by (pivotally mounted on) the supporting column.

At the respective ends of the rocking plate, the plurality of beams (stick-shaped (beam-shaped) members) are provided, so that the plurality of beams are subjected to the electrostatic force of the absorbing electrodes.

Thus, according to the arrangement of the present actuator, the supporting column pivotally supports the rocking plate. Therefore, tilting directions of the rocking plate (beams), i.e. rocking directions; direction into which the absorbing electrodes attract the rocking plate (beams) to the substrate, can be set freely.

Therefore, according to the present actuator, it is possible to tilt (attract) the rocking plate in a plurality of desired directions, by (i) providing the plurality of beams along a plurality of directions desired by a user, and (ii) providing the absorbing electrodes on the substrate so that the absorbing electrodes respectively correspond to the plurality of beams.

Therefore, if the present actuator is used in a microswitch, it is possible to form a microswitch suitable for practical use in that there is high degree of freedom as to the positions and number of substrate contact points.

For a fuller understanding of the nature and advantages of the invention, reference should be made to the ensuing detailed description taken in conjunction with the accompanying drawings.

DESCRIPTION OF THE EMBODIMENTS

The following describes one embodiment of the present invention.

A microswitch of the present embodiment (hereinafter "the present switch") is a switch using an electrostatic actuator (electrostatic driving microactuator), which is a MEMS technology. For example, the present switch is used in an electronic device, such as a portable phone (wireless communication device).

The electrostatic actuator is a structure that moves a movable section by means of electrostatic force.

The present switch drives a movable section (cap plate 3; described later) by means of electrostatic force. The movable section is provided to switch switching states (open/closed states of a switch circuit).

Figure 1:
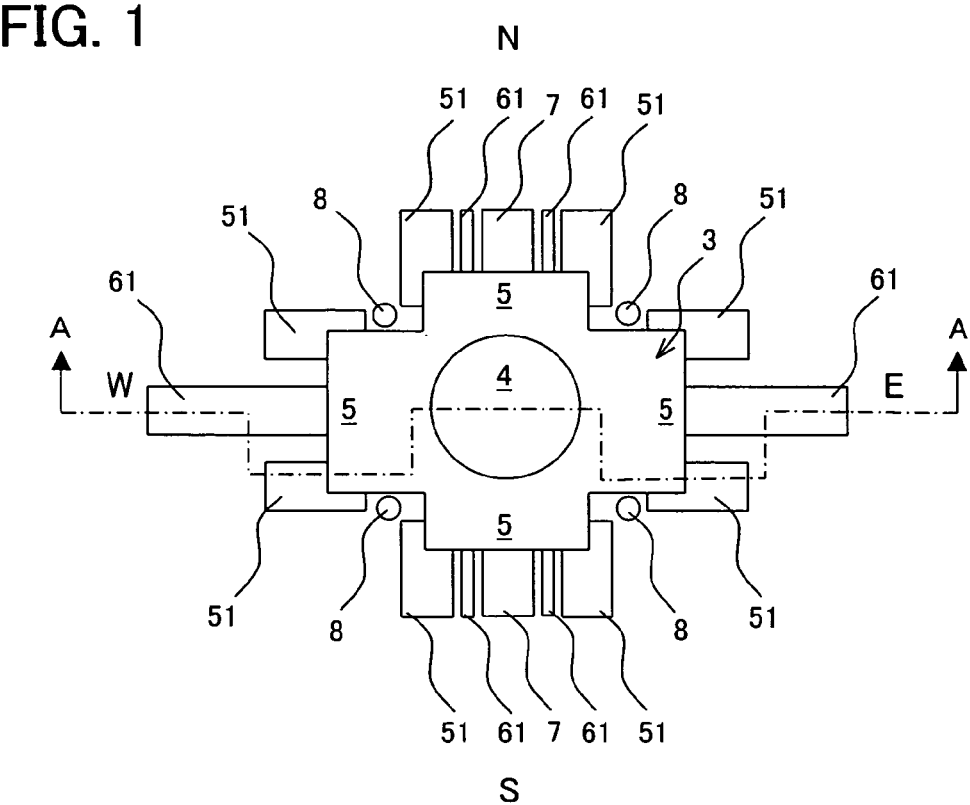
FIG. 1 is an overhead view illustrating an arrangement of a microswitch of one embodiment of the present invention.
Figure 2:
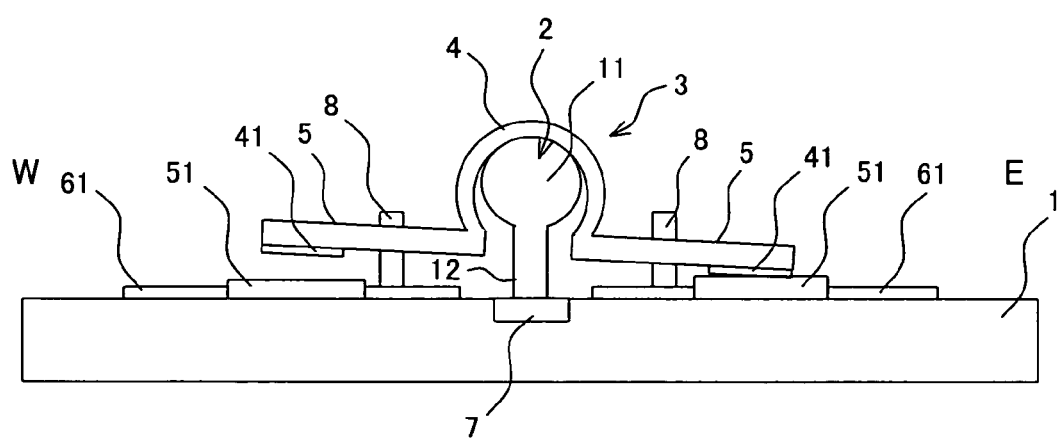
FIG. 2 is a cross-sectional view of the microswitch of FIG. 1, taken along line A—A.

FIG. 1 is an overhead view illustrating an arrangement of the present switch. FIG. 2 is a cross-sectional view taken along line A—A of FIG. 1.

On a substrate 1, which is a semiconductor made of silicon, the present switch has a supporting column 2, a cap plate 3, signal line electrodes 51, absorbing electrodes 61, a diffusion layer 7, and rotation constraining columns 8, as shown in FIGS. 1 and 2.

The diffusion layer 7 is a low-resistance part provided so as to extend in an N-S direction. A center of the diffusion layer 7 is where the supporting column 2 is provided on a surface of the substrate 1.

The diffusion layer 7 is made by performing ion implantation into a predetermined part of the substrate 1. An end of the diffusion layer 7 is grounded.

The supporting column 2 has a column capital part 11 having a spherical shape and a leg part 12 having a cylindrical shape. The leg part 12 supports the column capital part 11. The supporting column 2 stands on the diffusion layer 7 of the substrate 1 by means of the leg part 12.

The column capital part 11 has a diameter larger than that of the leg part 12. Both the column capital part 11 and the leg part 12 are made of phosphorus-containing polycrystalline silicon, and are therefore conductive.

The cap plate 3 is a rocking plate (movable section) having a cap dome 4 and four beams 5. The cap dome 4 and the beams 5 are made of conductive material (phosphorus-containing polycrystalline silicon). The cap plate 3 is supported by (pivoted by; pivotally mounted on) the supporting column 2.

The cap dome (dome part) 4 has a shape of a sphere with a missing part (hollow), and protrudes from a center of the cap plate 3. An inner wall of the cap dome 4 has a spherical surface shape (a shape that is a part of a sphere).

The beams 5 are plate-shaped parts extending from respective ends of the cap dome 4 (from an opening on a sphere) toward four directions N, S, W, and E (four directions 0°, 90°, 180°, and 270°).

As shown in FIG. 2, each of the beams 5 has, at an edge thereof, a contact electrode 41 on a lower surface (a surface facing the substrate 1; bottom surface). The contact electrode 41 is a low-resistance wire.

The cap plate 3, which is arranged as described above, is provided on the supporting column 2 in such a manner that the cap dome 4 surrounds (covers) the column capital part 11 of the supporting column 2. That is, the cap plate 3 is provided on the supporting column 2 in such a manner that the cap dome 4 and the column capital part 11 are engaged with one another.

Thus, the cap plate 3 can rock on the supporting column 2, which functions as a pivot (support).

According to the present switch, the column capital part 11 contacts the inner wall of the cap dome 4, and the cap plate 3 is pivoted on a contact portion. When the cap plate 3 tilts (rocks), the inner wall of the cap dome 4 slides on the column capital part 11.

The rotation constraining columns 8 are columns provided so that every two adjacent ones of the beams 5 of the cap plate 3 has one of the rotation constraining columns 8 therebetween.

The rotation constraining columns 8 are provided to prevent the cap plate 3 from rotating on the supporting column 2 (which functions as an axis of rotation) in parallel with the surface of the substrate 1 (i.e. so as to prevent the beams 5 from being misaligned with the four directions N, S, W, and E, respectively).

With this arrangement, the cap plate 3, pivoted by the supporting column 2, can rock only in such directions as to tilt (incline) toward the four directions N, S, W, and E.

The signal line electrodes 51 and the absorbing electrodes 61 are electrodes provided below the beams 5 of the cap plate 3 (on the surface of the substrate 1).

The signal line electrodes 51 are contact points of the switch. For each of the beams 5, which respectively extend in the four directions N, S, W, and E, two (a pair) of the signal line electrodes 51 are provided.

According to the present switch, when a pair of the signal line electrodes 51 (pairs are respectively provided in the four directions) is short-circuited, the pair of the signal line electrodes 51 is electrically connected. As a result, the pair of the signal line electrodes 51 is enabled to transmit a signal. That is, according to the present switch, it is possible to switch four kinds of switching states by selectively enabling a pair of the signal line electrodes 51 to transmit a signal.

Thus, in the present switch, the signal line electrodes 51 function as switching circuits whose ON/OFF states are switched.

As shown in FIG. 2, the height of the signal line electrodes 51 is such that, when one of the beams 5 tilts, the contact electrode 41 provided thereon contacts a corresponding one of the signal line electrodes 51. Therefore, when the cap plate 3 tilts in one of the directions N, S, W, and E, a pair of signal line electrodes 51 provided in that direction are short-circuited by the contact electrode 41 of a corresponding one of the beams 5.

The absorbing electrodes 61 are provided so that each one is between a pair of the signal line electrodes 51. In the W-direction and E-direction, each of the absorbing electrodes 61 is a single narrow plate. On the other hand, in the S-direction and N-direction, each of the absorbing electrodes 61 is branched into two so as to sandwich the diffusion layer 7 therebetween.

The absorbing electrodes 61 are positively charged in accordance with control by absorbing electrode control circuits (described later), respectively. Thus, each of the absorbing electrodes 61 electrostatically attracts the contact electrode 41 on a corresponding one of the beams 5 of the cap plate 3. In this way, each of the absorbing electrodes 61 causes the cap plate 3 to tilt, thereby short-circuiting a corresponding pair of the signal line electrodes 51.

Described next is how the absorbing electrodes 61 drive (rock) the cap plate 3.

Figure 3:
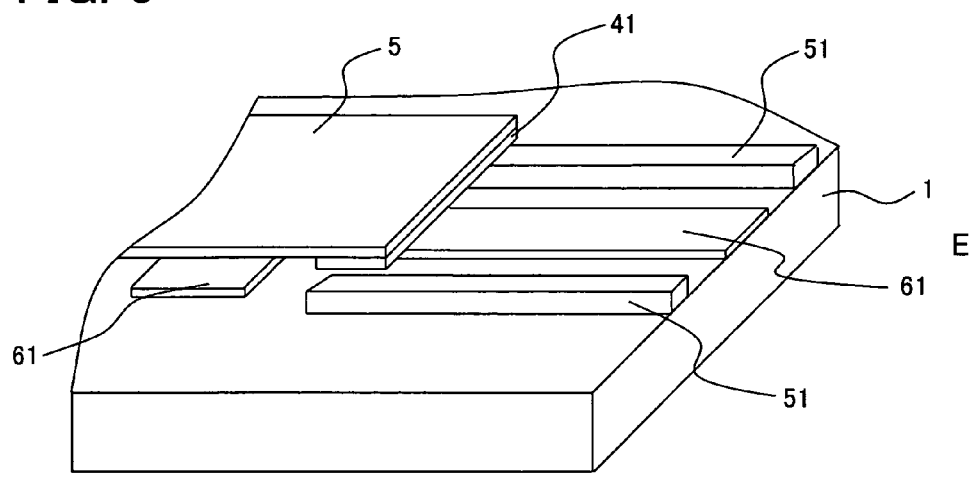
FIG. 3 is an explanatory diagram illustrating a state of equilibrium of a cap plate of the microswitch of FIG. 1.

FIG. 3 is an explanatory diagram illustrating a vicinity of the absorbing electrode 61 provided in the E-direction. In FIG. 3, none of the absorbing electrodes 61 in the four directions are positively charged.

In this case, the cap plate 3 keeps its balance on the supporting column 2 (that is, the cap plate 3 is not tilted in any direction) as long as the substrate 1 remains horizontal. Therefore, in the E-direction, the beam 5 remains detached from the signal line electrodes 51.

Such a state of equilibrium of the cap plate 3 can be attained also by respectively applying equivalent positive charges (electrostatic forces) to more than one of the absorbing electrodes 61 symmetrical to one another (rotationally symmetrical with respect to the supporting column 2).

Figure 4:
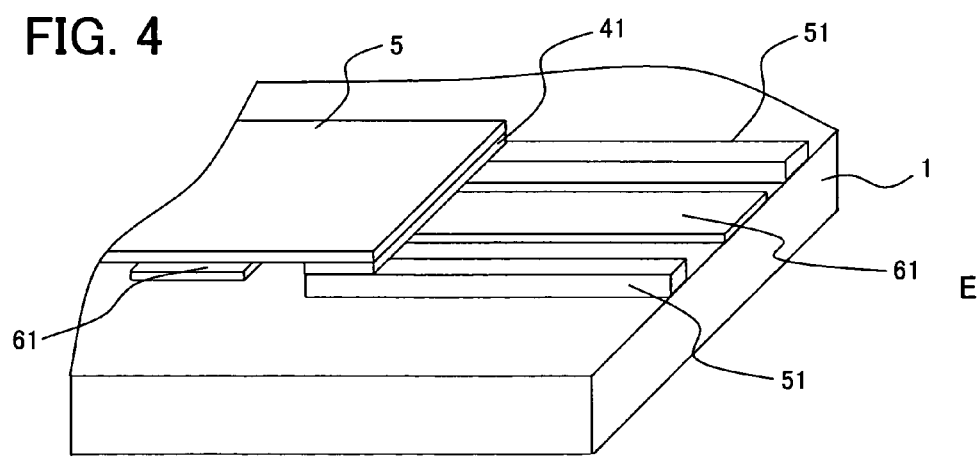
FIG. 4 is an explanatory diagram illustrating a state of one beam tilted to substrate of the microswitch of FIG. 1.

Meanwhile, FIG. 4 is an explanatory diagram illustrating a vicinity of the absorbing electrode 61 provided in the E-direction, the absorbing electrode 61 being positively charged as a result of voltage increase caused only on the absorbing electrode 61 by a control circuit thereof.

In this case, as shown in FIG. 4, electrostatic attracting force (absorbing force) is generated between the absorbing electrode 61 and the contact electrode 41. This causes the cap plate 3 to tilt in the E-direction. As a result, the signal line electrodes 51 are short-circuited.

As described above, the present switch is structured as follows: the supporting column 2 is provided on the substrate 1, and the cap plate 3 is provided on the supporting column 2. The cap plate 3 is pivoted by (pivotally mounted on) the supporting column 2.

The beams 5 are provided at respective ends of the cap plate 3, so that the beams 5 are subjected to the electrostatic force of the absorbing electrodes 61.

Thus, according to the arrangement of the present switch, the supporting column 2 pivotally supports the cap plate 3. Therefore, tilting directions of the cap plate 3 or the beams 5 (rocking directions; directions into which the absorbing electrodes 61 attract the cap plate 3 or the beams 5 to the substrate 1) can be set freely.

Therefore, according to the present switch, it is possible to tilt (attract) the cap plate 3 in a plurality of desired directions, if the beams 5 are provided along a plurality of directions desired by a user, and the absorbing electrodes 61 are provided on the substrate 1 so as to correspond to the beams 5, respectively.

Thus, the present switch is a microswitch suitable for practical use, in that there is high degree of freedom as to positions and number of substrate contact points.

According to the present switch, the supporting column 2 has the leg part 12 (which is fixed on the substrate 1) and the column capital part 11 (which is provided on the leg part 12). The column capital part 11 is wider than the leg part 12.

The cap plate 3 has the cap dome 4, which is hollow. The beams 5 are provided at respective ends of the cap dome 4. The cap dome 4 engages the column capital part 11 of the supporting column 2 in a surrounding manner (pivotally).

According to this arrangement, it is easy to tilt the cap plate 3 in desired directions, by using the supporting column 2 as a fulcrum. In addition, it is possible to prevent the cap plate 3 from being separated (detached) from the supporting column 2.

According to the present switch, the inner wall of the cap dome 4 has a spherical surface shape, and a contact portion (a portion that contacts the cap dome 4) of the column capital part 11 of the supporting column 2 has a spherical surface shape. With this arrangement, the cap dome 4 can easily rock (slide) on the column capital part 11.

The present switch has the four beams 5, which respectively extend in four different directions. Therefore, four contact points can be provided to the switch. As a result, it is possible to switch four states by the single switch.

The present switch has the rotation constraining columns 8. The rotation constraining columns 8 stop rotation of the cap plate 3 by contacting the beams 5. With this arrangement, it is possible to prevent the cap plate 3 from rotating in a direction parallel to the substrate 1, thereby preventing changes to the directions in which the beams 5 respectively extend.

According to the present switch, the cap plate 3 is pivoted by the supporting column 2. Therefore, the cap plate 3 is in a half-fixed state. With this arrangement, it is possible to rock the cap plate 3 without increasing the voltage applied to the absorbing electrodes 61.

Moreover, spring of the cap plate 3 (or the beams 5) is not utilized (in other words, the beams 5 are not bent). With this arrangement, it is possible to decrease structural damage to and changes over time of the cap plate 3 and the beams 5, thereby enhancing long-term reliability.

The following describes a method of manufacturing the present switch.

Figure 5:
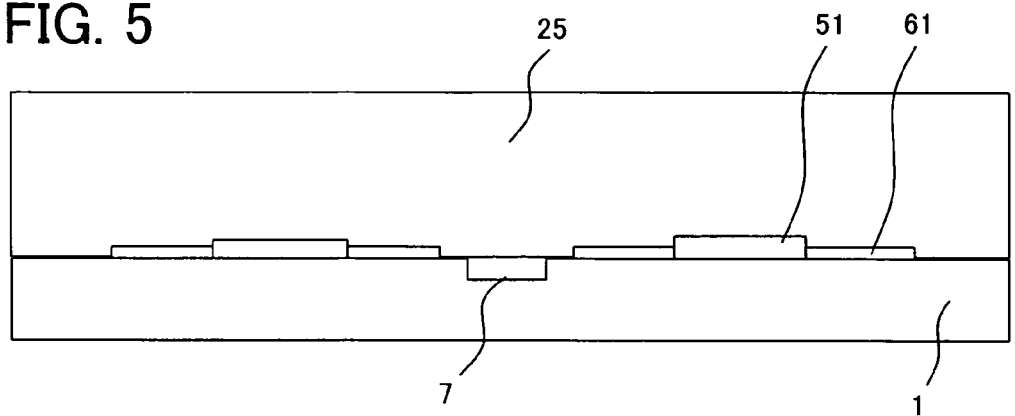
FIG. 5 is an explanatory diagram illustrating manufacturing process of the microswitch of FIG. 1.

First, as shown in FIG. 5, the diffusion layer 7 is formed in the substrate 1 by ion implantation or the like method. The substrate 1 is a semiconductor made of silicon. The diffusion layer 7 is a low-resistance region. Then, on the substrate 1, the signal line electrodes 51, the absorbing electrodes 61, and wires (not shown) for controlling the signal line electrodes 51 and the absorbing electrodes 61 are formed. After that, a first insulating film (silicon dioxide film) 25 made of silicon dioxide is formed.

In forming the signal line electrodes 51 and the absorbing electrodes 61, an evaporation or spattering method is employed for film-forming, and a liftoff method (or an etching method) is employed.

Figure 6:
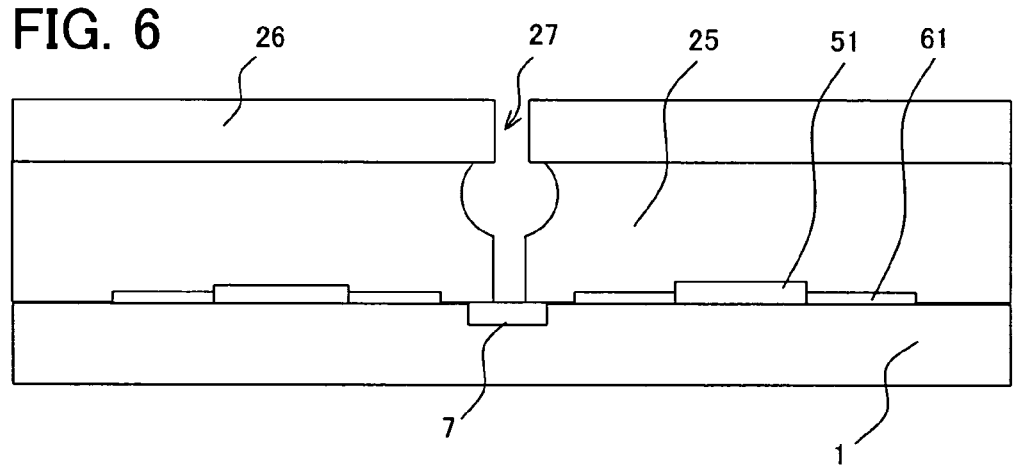
FIG. 6 is an explanatory diagram illustrating the manufacturing process of the microswitch of FIG. 1.

Next, as shown in FIG. 6, photoresist is applied to the first insulating film 25. Then, an opening 27 is formed by an ordinary photolithography method. In this way, a photoresist mask 26 is formed.

The opening 27 has a round shape (on a surface of the photoresist mask 26).

Next, by using, for example, an aqueous solution of hydrofluoric acid, isotropic etching is performed on the first insulating film 25 in a depth direction (a direction vertical to the surface of the substrate 1) until a middle of the first insulating film 25 (until the thickness of the insulating film 25 becomes equal to the length of the leg part 12).

Then, by employing, for example, a reactive etching method (which is a dry etching method), anisotropic etching is performed until the surface of the substrate 1 is exposed. As a result, an opening pattern is formed in the first insulating film 25. The opening pattern is narrow in the vicinity of the substrate 1, and wide in the vicinity of the surface of the photoresist mask 26.

Figure 7:
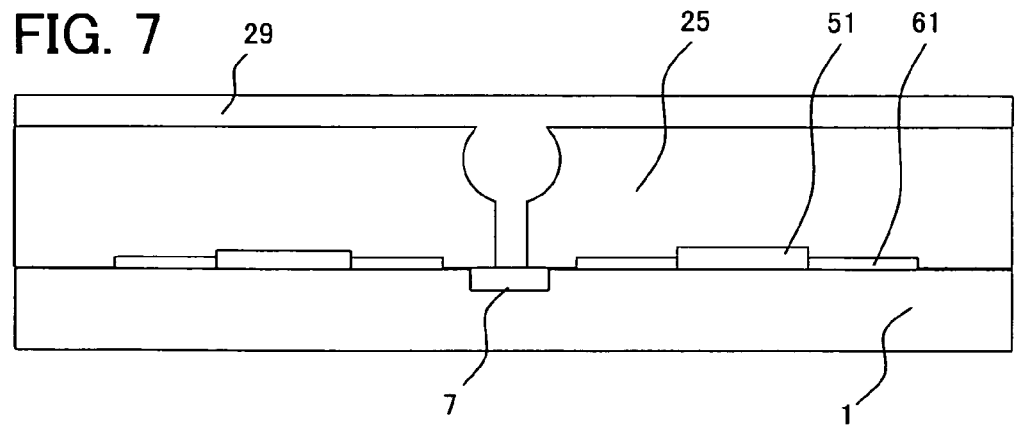
FIG. 7 is an explanatory diagram illustrating the manufacturing process of the microswitch of FIG. 1.

Next, as shown in FIG. 7, the photoresist mask 26 is removed. Then, on the first insulating film 25 and inside the opening thereof, a first polycrystalline silicon film 29 is formed while spreading an impurity (e.g. phosphorous), until the thickness of the first polycrystalline silicon film 29 reaches at least a surface of the first insulating film 25.

The first polycrystalline silicon film 29 formed inside the opening of the first insulating film 25 is to be the supporting column 2 of the present switch. That is, the first polycrystalline silicon film 29 formed at an isotropically etched part of the opening is to be the column capital part 11 of the supporting column 2. The first polycrystalline silicon film 29 formed at an anisotropically etched part of the opening is to be the leg part 12 of the supporting column 2.

Figure 8:
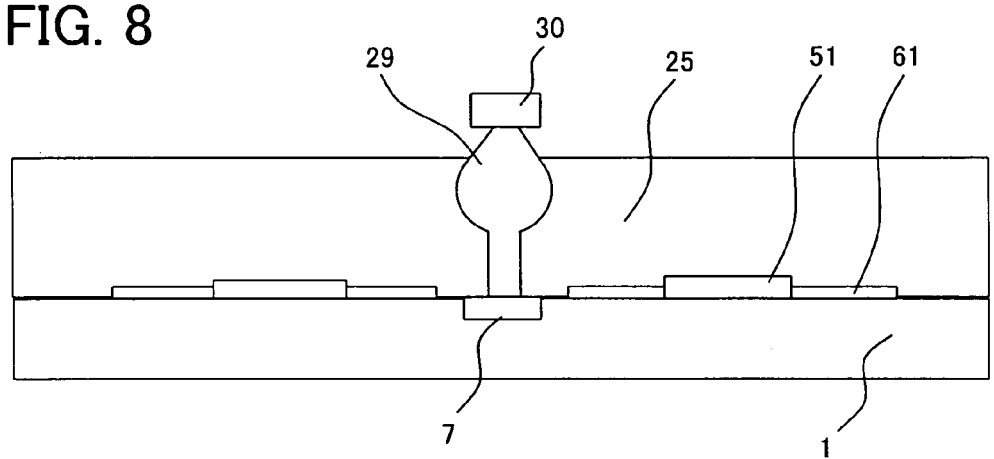
FIG. 8 is an explanatory diagram illustrating the manufacturing process of the microswitch of FIG. 1.

Next, as shown in FIG. 8, a resist pattern (resist mask) 30 for masking the opening of the first insulating film 25 is formed by the photolithography method. After that, by the reactive etching or the like method, the first polycrystalline silicon film 29 is removed, except the part masked by the resist pattern 30 (the part to be the supporting column 2). Subsequently, the resist pattern 30 is removed.

Figure 9:
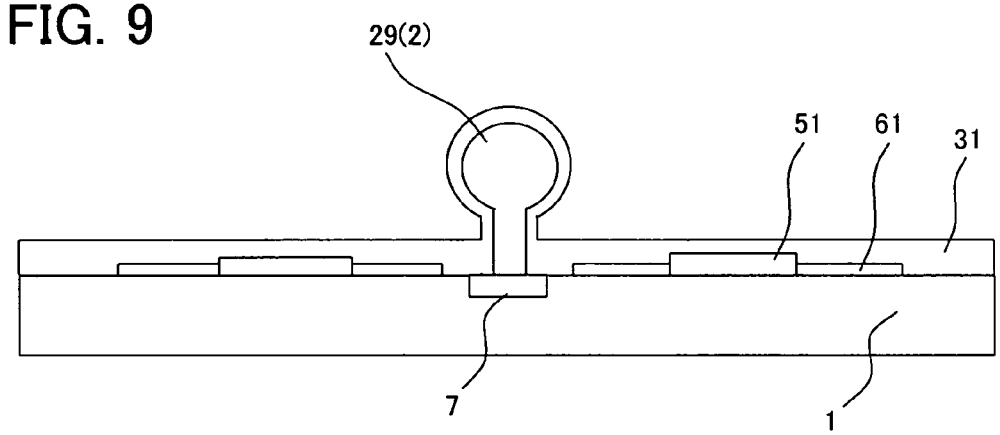
FIG. 9 is an explanatory diagram illustrating the manufacturing process of the microswitch of FIG. 1.

Next, as shown in FIG. 9, the first insulating film 25 is removed. At this stage, an acute-angled part formed by the etching remains on a surface of the first polycrystalline silicon film 29 to be the supporting column 2 (especially at an edge of the part to be the column capital part 11).

Thereafter, by the reactive etching or the like method, the surface of the first polycrystalline silicon film 29 is etched under an isotropic etching condition, so as to round the acute-angled part.

As a result, the first polycrystalline silicon film 29 becomes the supporting column 2 having the column capital part 11 and the leg part 12.

Then, on an entire surface of the substrate 1, the entire surface including the supporting column 2, a second insulating film (silicon dioxide film; sacrifice film) 31 made of silicon dioxide is formed.

Figure 10:
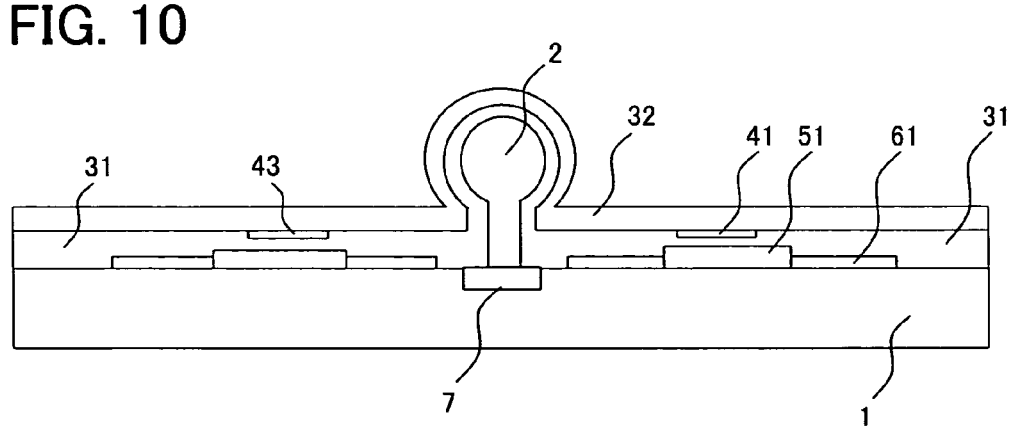
FIG. 10 is an explanatory diagram illustrating the manufacturing process of the microswitch of FIG. 1.

Next, as shown in FIG. 10, the contact electrodes 41 are formed at predetermined parts of the second insulating film 31, respectively. Like the signal line electrodes 51 and the absorbing electrodes 61, the contact electrodes 41 can be formed (patterned) by employing the evaporation or spattering method for film-forming, and employing the liftoff method (or the etching method).

Subsequently, on the second insulating film 31 (including the contact electrodes 41), a second polycrystalline silicon film 32 is formed while spreading an impurity (e.g. phosphorous). The second polycrystalline silicon film 32 is to be the cap plate 3 of the present switch.

Figure 11:
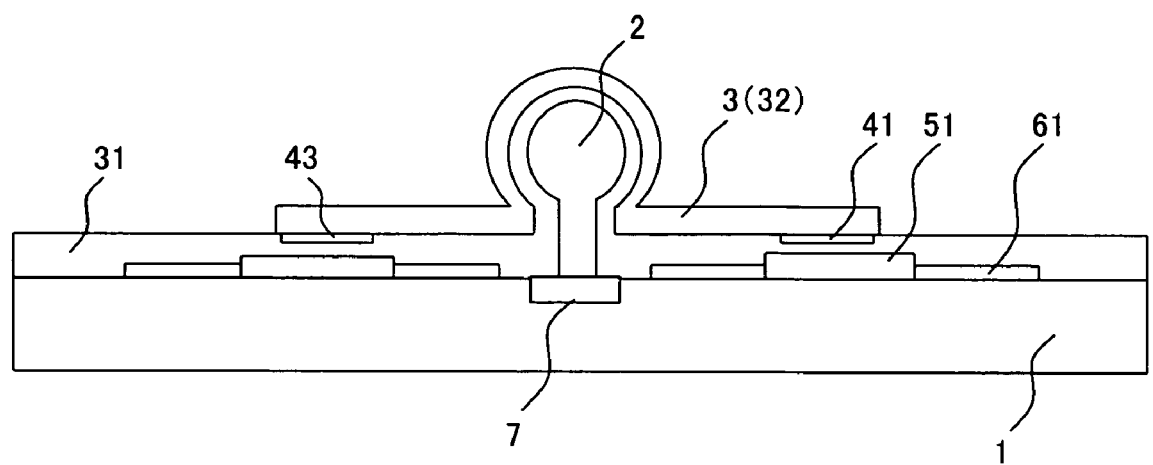
FIG. 11 is an explanatory diagram illustrating the manufacturing process of the microswitch of FIG. 1.

Next, on the second polycrystalline silicon film 32, a photoresist mask (not shown) is formed by the photolithography method. After that, by the reactive etching or the like method, the second polycrystalline silicon film 32 is etched (patterned), so as to form the cap plate 3 as shown in FIG. 11.

Next, the photoresist mask is removed, and the second insulating film 31 is removed by etching. In this etching, as shown in FIG. 11, etchant is infiltrated from exposed parts of the insulating film 31 (those parts on which the cap plate 3 is not provided) toward those parts below the cap plate 3. This etching can be performed by a wet etching method using an aqueous solution of hydrofluoric acid or by a dry etching method.

In this way, the cap dome (joint part) 4 of the cap plate 3 is formed. The cap plate 3 is provided on the supporting column (supporting material) 2 in such a manner that the cap dome 4 covers the supporting column 2. As a result, production of the present switch shown in FIGS. 1 and 2 is completed.

Thus, the present switch can be manufactured by performing semiconductor processing on the single substrate 1. Therefore, it is possible to simplify manufacturing process, and it is easy to miniaturize the present switch.

In the present embodiment, four kinds of switching states are switched by short-circuiting a pair of the signal line electrodes 51 (the pairs are respectively provided in the four directions), thereby electrically connecting the pair of the signal line electrodes 51. Such short-circuit is necessary if the signal transmitted between the pair of signal line electrodes 51 is a direct current signal (DC signal).

However, if the signal outputted to the pair of signal line electrodes 51 is a radio frequency signal (RF signal), it is possible to electrically connect the pair of signal line electrodes 51 to perform signal transmission, if a dielectric material (capacitor) is provided therebetween. In this case, it is not necessary to short-circuit the pair of signal line electrodes 51.

Figure 12:
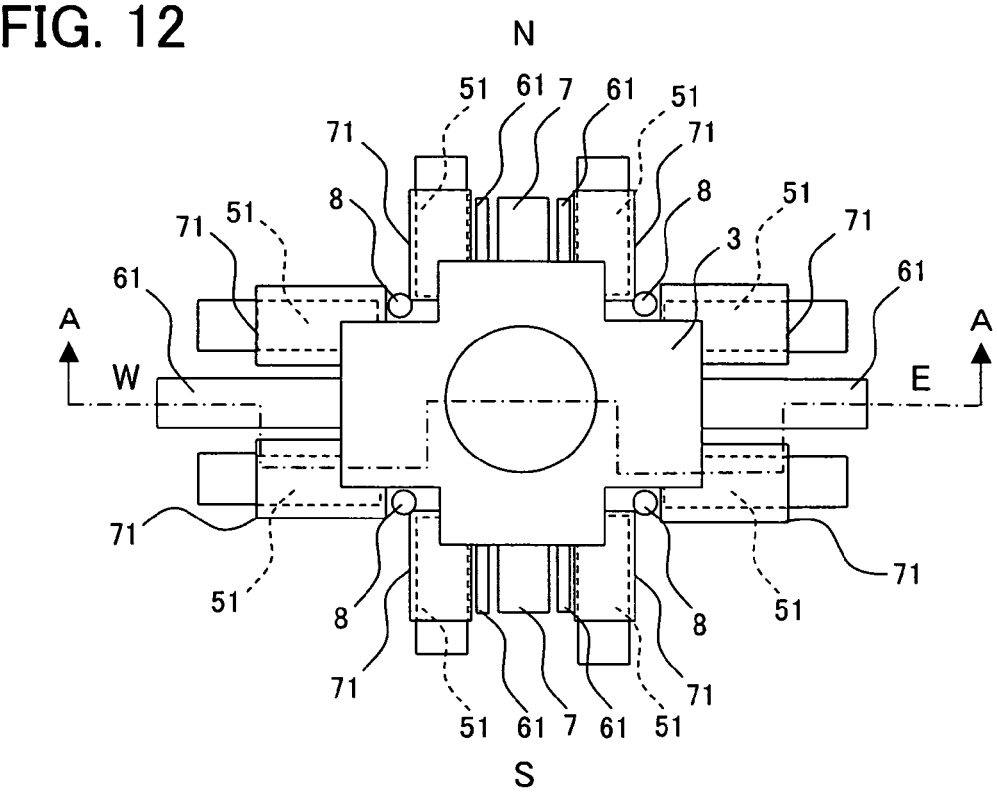
FIG. 12 is an explanatory diagram illustrating an arrangement of the microswitch of FIG. 1 having a dielectric film.
Figure 13:
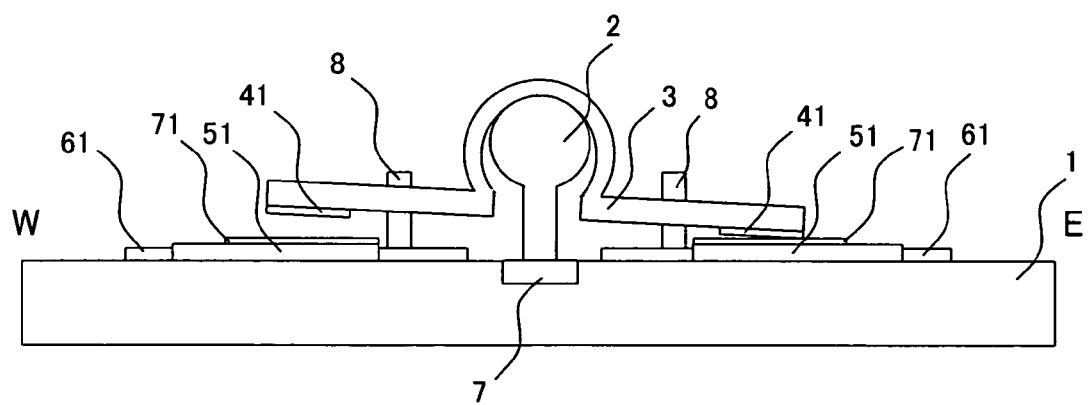
FIG. 13 is a cross-sectional view of the microswitch of FIG. 12, taken along line A—A.

FIG. 12 is an overhead view illustrating an arrangement of the present switch to perform such signal transmission. FIG. 13 is a cross-sectional view taken along line A—A of FIG. 12.

As shown in FIGS. 12 and 13, according to this arrangement, a dielectric film 71 is provided on a surface of each contact electrode 41 of the beams 5 (the beams 5 respectively extend in the four directions). The dielectric film 71 is a silicon nitride film, a titanium oxide film, or a tantalum oxide film, for example.

With this arrangement, switching operation (signal transmission between a pair of the signal line electrodes 51) can be attained by causing the dielectric film 71 to contact the pair of the signal line electrodes 51.

The dielectric film 71 may be provided not on the surface of each contact electrode 41, but on a surface of each of the signal line electrodes 51. Alternatively, the dielectric film 71 may be provided both on the surface of each contact electrode 41 and on the surface of each of the signal line electrodes 51.

Depending on a frequency of the RF signal, it is possible to electrically connect (for signal transmission) a pair of the signal line electrodes 51 by simply moving a contact electrode 41 closer to the pair of the signal line electrodes 51. In this case, it is not necessary to use the dielectric film 71.

Figure 14:
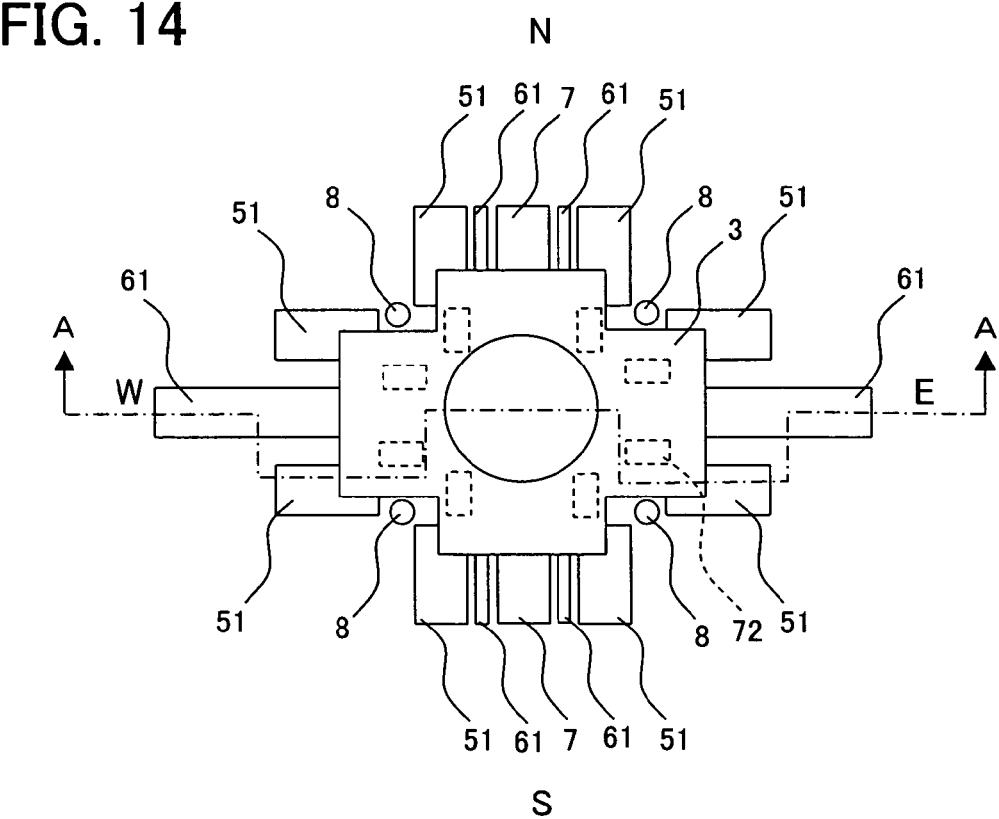
FIG. 14 is an explanatory diagram illustrating the microswitch of FIG. 1 having stoppers.
Figure 15:
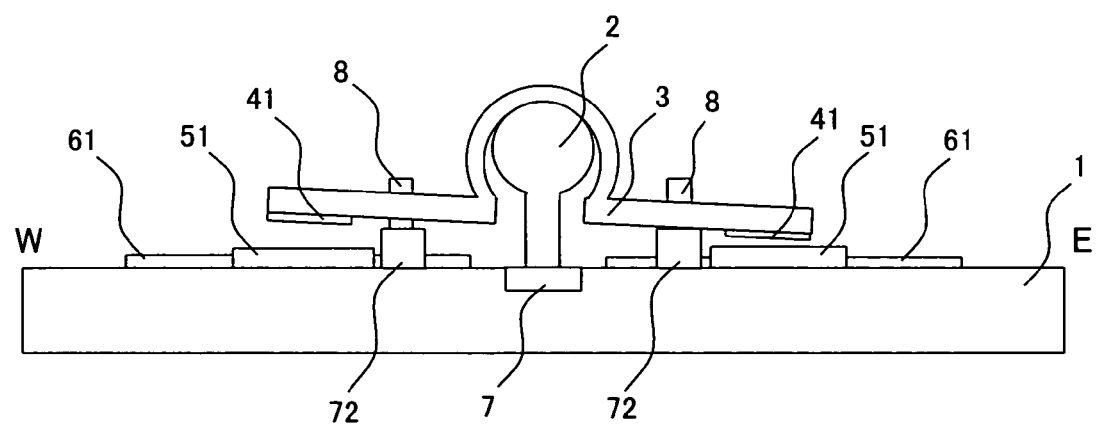
FIG. 15 is a cross-sectional view of the microswitch of FIG. 14 taken along line A—A.

FIG. 14 is an overhead view illustrating an arrangement of the present switch to perform such signal transmission. FIG. 15 is a cross-sectional view taken along line A—A of FIG. 14.

As shown in FIGS. 14 and 15, according to this arrangement, stoppers (stopper patterns) 72 for preventing contact between a pair of the signal line electrodes 51 and a contact electrode 41 are provided between the pair of the signal line electrodes 51 and the supporting column 2, on the substrate 1.

According to this arrangement, when one of the beams 5 is attracted to the substrate 1 by the electrostatic force of a corresponding one of the absorbing electrode 61, that one of the beams 5 stops by contacting the stoppers 72. As a result, a narrow gap is created between the contact electrode 41 and the pair of the signal line electrodes 51. This allows for signal transmission between the pair of the signal line electrodes 51.

As described above, the RF signal can be transmitted by simply providing the dielectric material or the narrow gap between the contact electrode 41 and the pair of the signal line electrodes 51, without causing short-circuit between the pair of the signal line electrodes 51. As a result, it is possible to attain small loss and high isolation.

In this case, because the thickness of the dielectric material (or the size of the gap) between the contact electrode 41 and the pair of the signal line electrodes 51 determines capacitance value, accuracy of the thickness of the dielectric material (or the size of the gap) is important.

The capacitance value needs to be a value suitable for a switching characteristic at a frequency of the signal transmitted. Therefore, the capacitance value varies according to the frequency.

The contact between the contact electrode 41 and the pair of the signal line electrodes 51 causes a problem of abrasion and adhesion of contact points, because the contact electrode 41 and the pair of the signal line electrodes 51 are made of metal. However, if the dielectric material or the gap is provided between the contact electrode 41 and the pair of the signal line electrodes 51 as described above, the abrasion and adhesion are prevented, thereby enhancing reliability.

In case the gap is created between the contact electrode 41 and the pair of the signal line electrodes 51 as shown in FIGS. 14 and 15, what is provided therebetween is air (gas), instead of the dielectric film 71. In this case, no contact occurs between the contact electrode 41 and the pair of the signal line electrodes 51. This further enhances reliability, because a possibility of abrasion and adhesion is completely eliminated. In this case, it is preferable if the gap between the contact electrode 41 and the pair of the signal line electrodes 51 is as narrow as several tens of nanometers, considering dielectric constant of air.

As described above, the present switch can be manufactured by performing semiconductor processing on the single substrate 1.

In addition, on the substrate 1 of the present switch, an absorbing electrode control circuit (electrostatic force applying circuit; driving circuit (driving element)), which is a semiconductor element for controlling (driving) a corresponding one of the absorbing electrodes 61 of the present switch, may also be formed.

Figure 16:
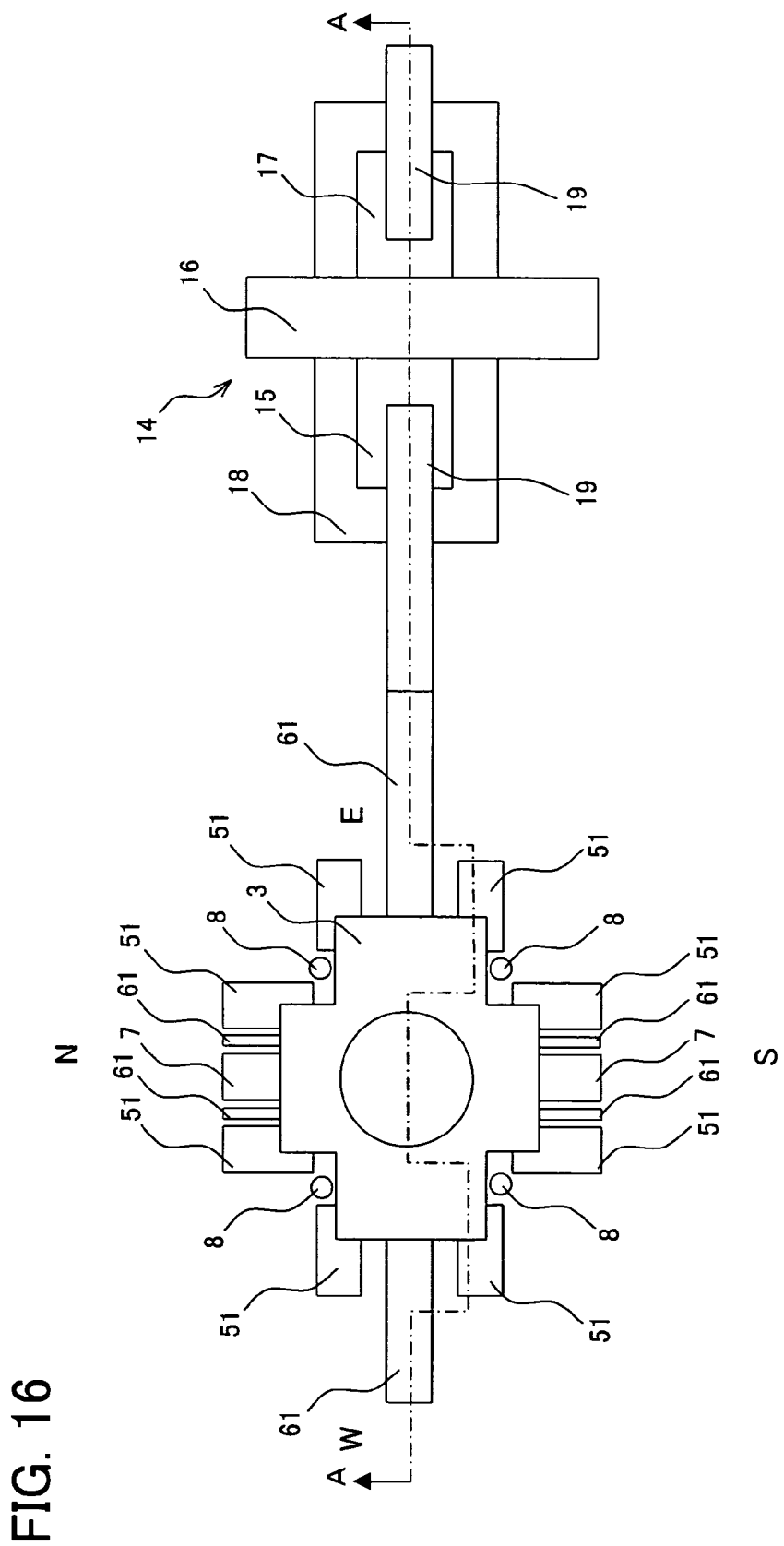
FIG. 16 is an overhead view illustrating the microswitch of FIG. 1 having on the substrate an absorbing electrode control circuit for controlling an absorbing electrode.
Figure 17:
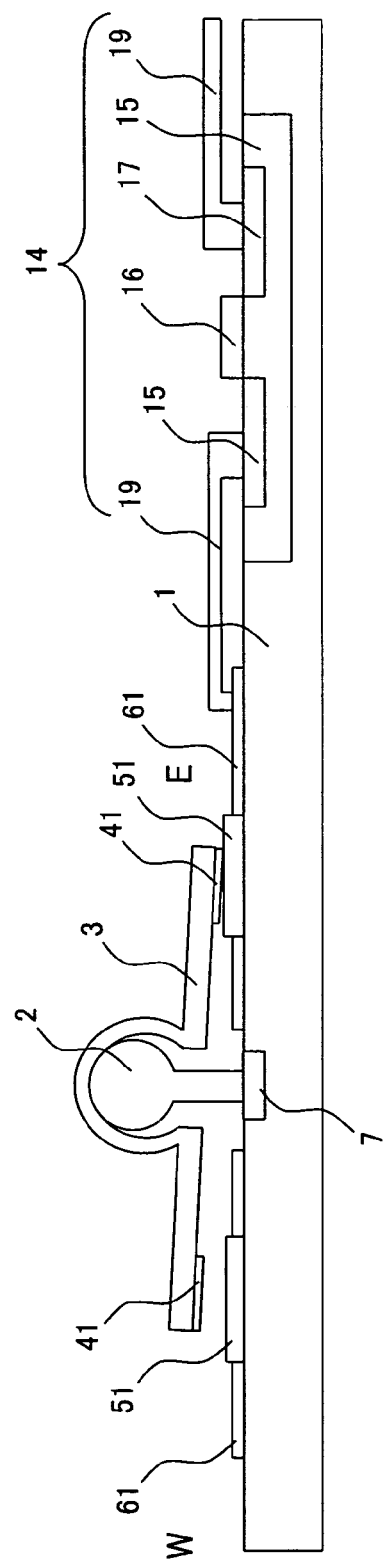
FIG. 17 is a cross-sectional view taken along line A—A of FIG. 16.

FIG. 16 is an overhead view illustrating an arrangement where an absorbing electrode control circuit 14 for controlling a corresponding one of the absorbing electrodes 61 is formed on the substrate 1. FIG. 17 is a cross-sectional view taken along line A—A of FIG. 16.

As shown in FIGS. 16 and 17, the absorbing electrode control circuit 14 includes a source diffusion layer 15, a gate electrode wire 16, a drain diffusion layer 17, a well 18, and FET source/drain electrodes 19.

Figure 18:
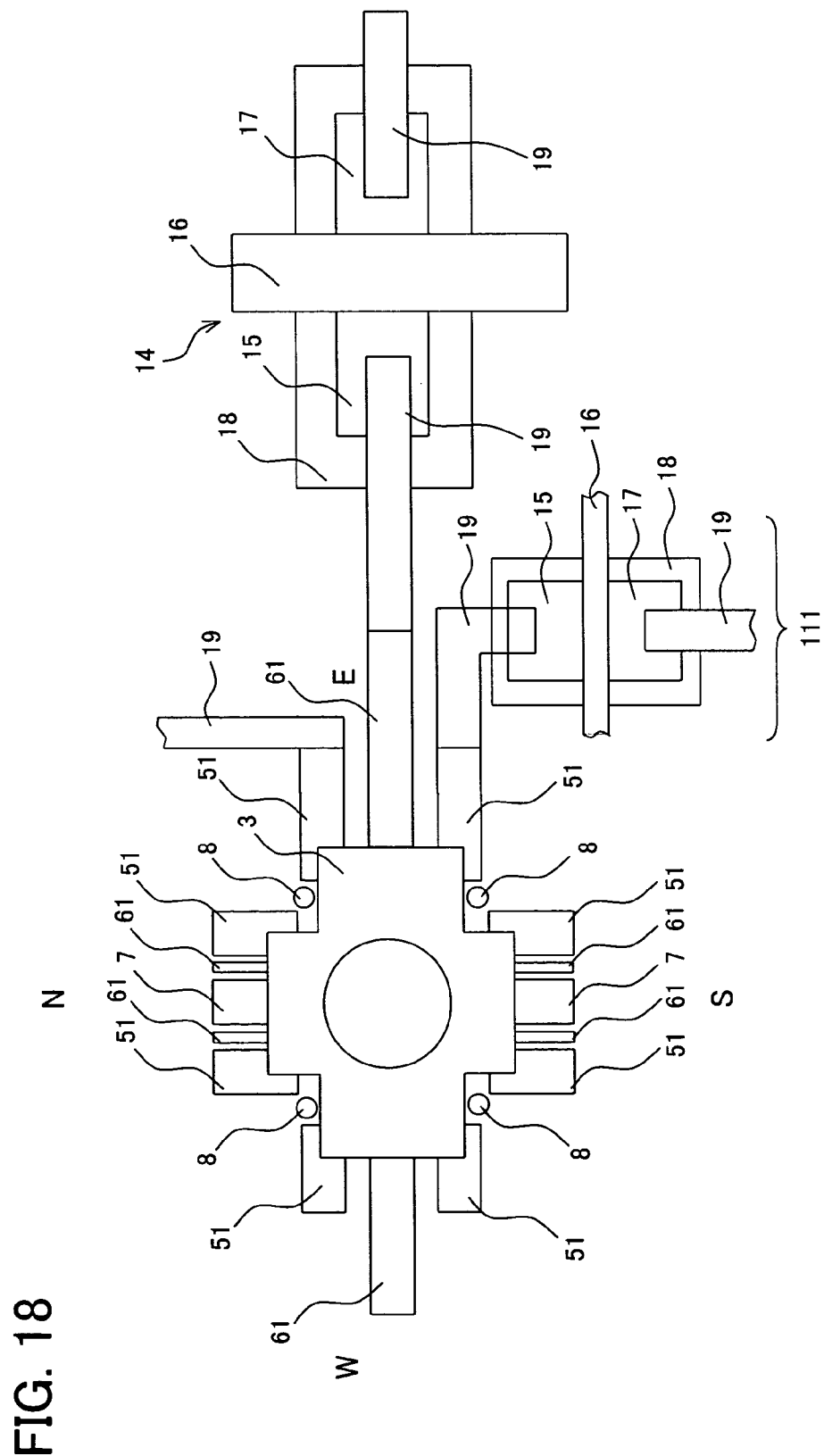
FIG. 18 is an overhead view illustrating the arrangement of FIG. 16 to which a signal circuit is added.

In addition, as shown in FIG. 18, a signal circuit (e.g. a radio frequency (RF) circuit) 111 connected to a corresponding one of the signal line electrodes 51 may be formed on the substrate 1 of the present switch.

Like the absorbing electrode control circuit 14, the signal circuit 111 includes a source diffusion layer 15, a gate electrode wire 16, a drain diffusion layer 17, a well 18, and FET source/drain electrodes 19.

By thus integrating the present switch with the absorbing electrode control circuit 14 and the signal circuit 111, these circuits can be mounted on a single chip. Therefore, only small area is required in order to mount these circuits on a printed circuit. As a result, it is possible to attain miniaturization and cost reduction of a device including the present switch.

In the foregoing explanation, the absorbing electrode control circuit 14 and the signal circuit 111 are FET elements. However, the same effects (miniaturization and cost reduction) can be attained by using C-MOS, HBT, or other semiconductor elements to form the absorbing electrode control circuit 14 and the signal circuit 111.

In FIGS. 16 through 18, only the absorbing electrode control circuit 14 and the signal circuit 111 respectively associated with the signal line electrode 51 and the absorbing electrode 61 in the E-direction are illustrated. However, absorbing electrode control circuits 14 and signal circuits 111 associated with the signal line electrodes 51 and the absorbing electrodes 61 in N, S, and W-directions may also be provided on the substrate 1.

If other semiconductor elements (e.g. amplifiers) are provided on the substrate 1 in addition to the absorbing electrode control circuit 14 and the signal circuit 111, further miniaturization and cost reduction can be attained.

According to the arrangement shown in FIGS. 16 through 18, the absorbing electrode control circuit 14 and the signal circuit 111 are provided side-by-side with the present switch, on the substrate 1 of the present switch.

However, the present switch may be laminated on the absorbing electrode control circuit 14 and the signal circuit 111 after absorbing electrode control circuit 14 and the signal circuit 111 are formed on the substrate 1. With this arrangement, it is possible to attain further miniaturization and cost reduction of an electronic device including the present switch.

Next, an electronic device including the present switch is described.

Figure 19:
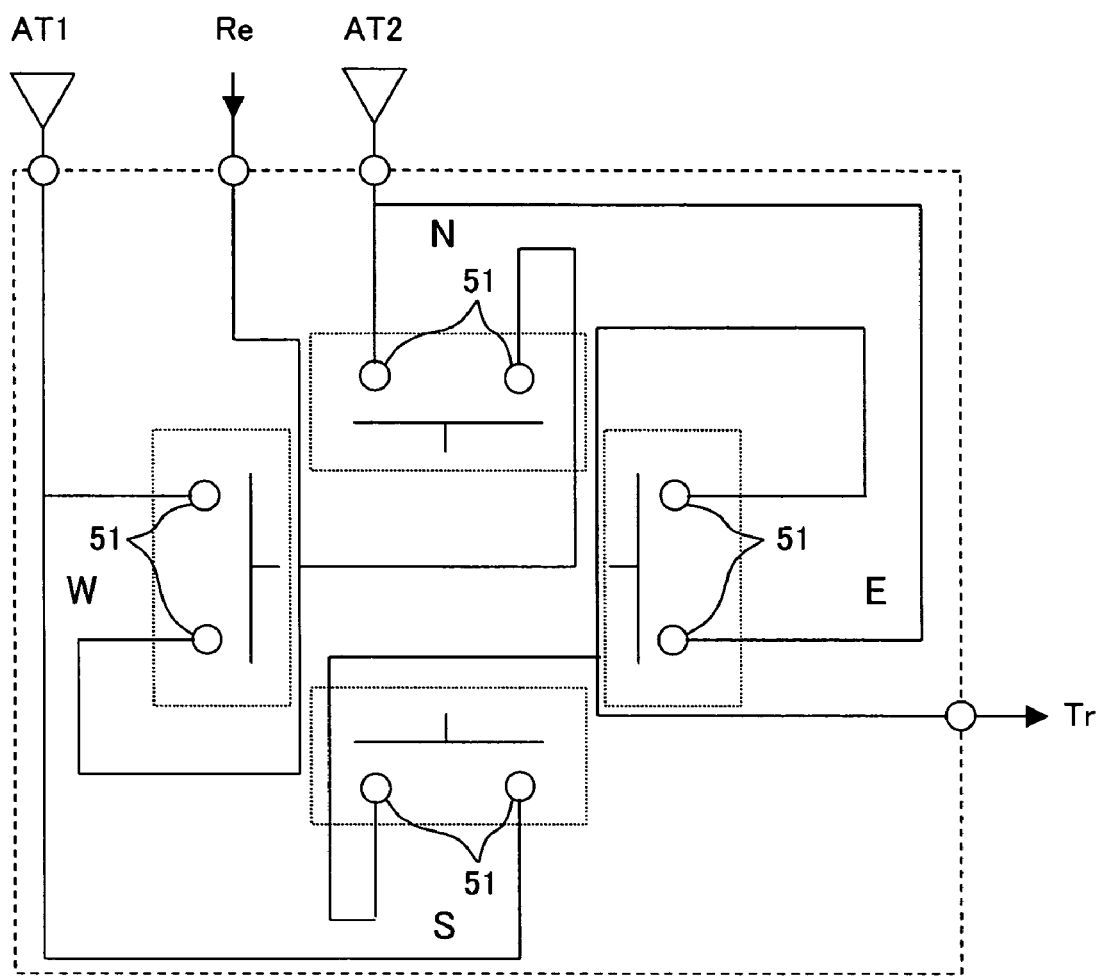
FIG. 19 is an equivalent circuit diagram illustrating a case in which the microswitch of FIG. 1, 12, or 14 is used in a digital portable phone.

FIG. 19 is an equivalent circuit diagram illustrating an example where the present switch is used in a digital portable phone.

In general, a digital portable phone switches (adjusts) power of outgoing radio waves in accordance with a distance from an intermediary station. That is, the radio waves are transmitted at low power when the distance is short, and at high power when the distance is long. Therefore, such a digital portable phone has two kinds of antennas: one is for low-power transmission, and the other is for high-power transmission. Which antenna to use for transmission is switched by a switch.

The digital portable phone includes a radio-frequency-use power amplifier used both at the time of transmission and reception. The radio-frequency-use power amplifier is connected to different circuits at the time of transmission and at the time of reception, and which circuit to connect the radio-frequency-use power amplifier to is switched by a switch.

If, as shown in FIG. 19, the present switch (especially the switch for radio frequency signals; see FIGS. 12 and 14) is used in such a portable phone, switching between the transmission-use antennas and switching between transmission and receipt can be performed by the present switch alone.

In this case, the signal line electrodes 51 in the S-direction are connected to an antenna terminal AT1 (for low power), whereas the signal line electrodes 51 in the N-direction are connected to an antenna terminal AT2 (for high power).

Meanwhile, the signal line electrodes 51 in the E-direction are connected to a transmission terminal Tr, whereas the signal line electrodes 51 in the W-direction are connected to a reception terminal Re.

If the antenna terminal AT1 is to be used, the absorbing electrode 61 in the S-direction is positively charged. This causes the cap plate 3 to tilt in the S-direction, thereby electrically connecting the signal line electrodes 51 in the S-direction. As a result, the antenna terminal AT1 is activated. Likewise, if the transmission terminal Tr or the reception terminal Re is to be activated, the signal line electrodes 51 in the S, N, or W-direction are electrically connected.

Thus, according to the present switch, it possible to perform plural kinds of switching by the single switch. Therefore, circuits of a portable phone can be mounted in smaller area (at high efficiency). Moreover, it is possible to perform switching with high isolation and small loss, thereby attaining lower power consumption.

In the present embodiment, the column capital part 11 of the supporting column 2 has a spherical shape. However, it is not necessary that the column capital part 11 as a whole have a spherical shape, as long as a contact portion (a portion that contacts the cap dome 4) of the column capital part 11 has a spherical surface shape (a shape that is a part of a sphere).

The shape of the column capital part 11 is not limited to the spherical shape.

Figure 20:
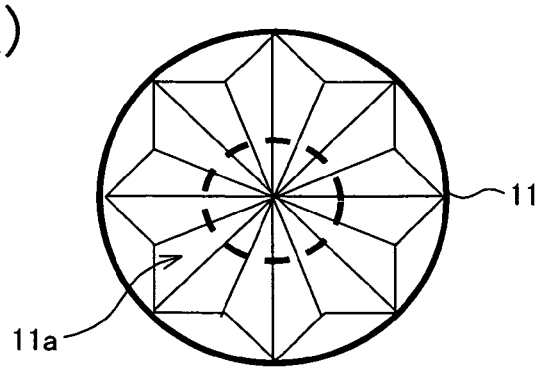
FIG. 20(a) is an explanatory diagram illustrating a supporting column of the microswitch of FIG. 1, the supporting column having depressed portions on a column capital part 11.
FIG. 20(b) is a side view of the supporting column.
Figure 20:
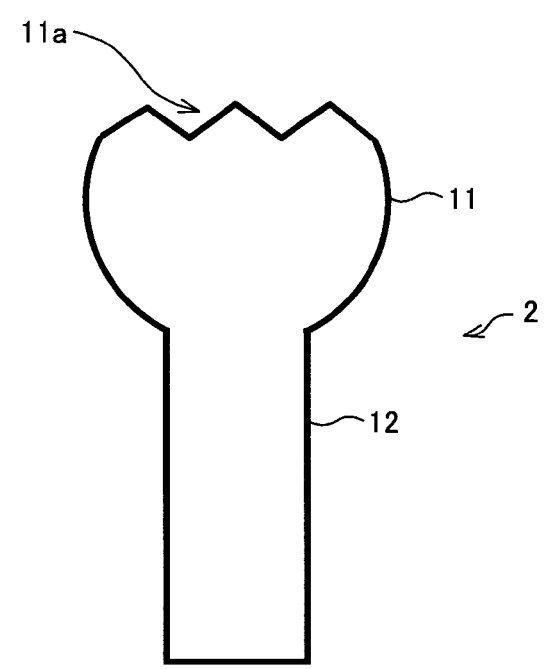

As shown in FIGS. 20(a) (overhead view) and 20(b) (side view), the column capital part 11 may have depressed portions (cut-off portions) 11a at a top thereof. It is preferable if four of the depressed portions 11a are provided along the four directions N, S, E, and W, respectively.

Figure 21:
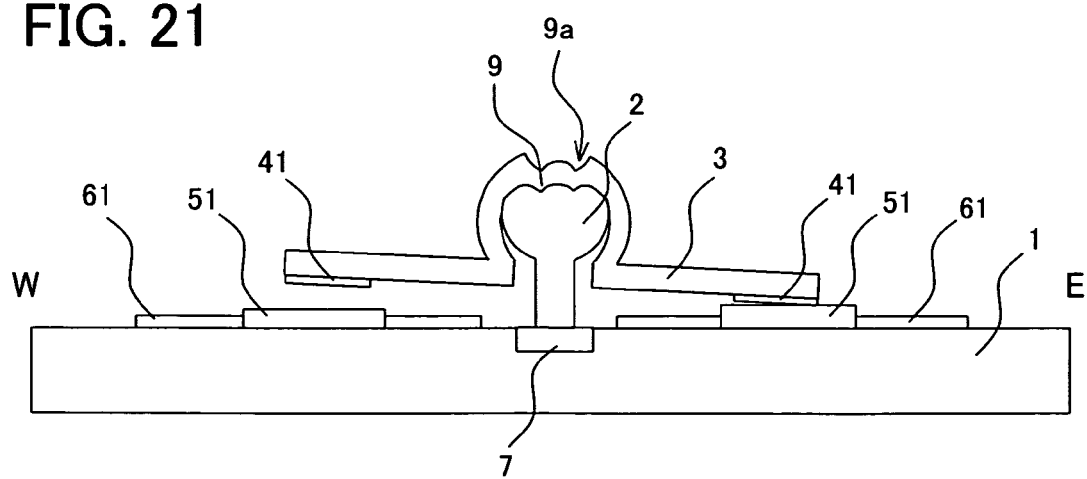
FIG. 21 is an explanatory diagram illustrating an arrangement of a microswitch having the supporting column of FIGS. 20(a) and 20(b).

In this case, it is preferable if, as shown in FIG. 21, protruding portions 9 are provided on the inner wall of the cap dome 4 of the cap plate 3 so as to respectively correspond to the depressed portions 11a, and the protruding portions 9 can respectively fit the depressed portions 11a of the column capital part 11.

Figure 22:
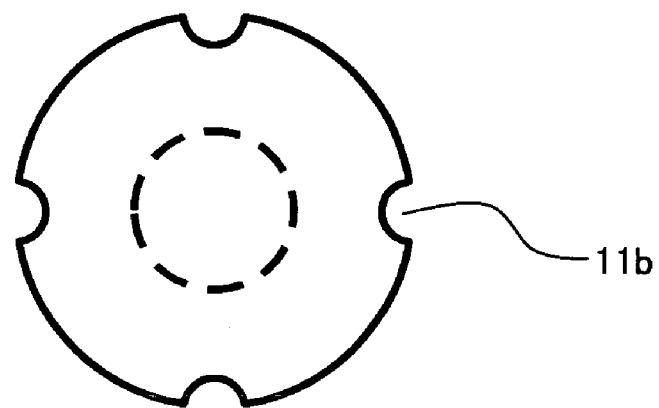
FIG. 22(a) is an explanatory diagram illustrating a supporting column of the microswitch of FIG. 1, the supporting column having depressed portions on a column capital part 11.
FIG. 22(b) is a side view of the supporting column.
Figure 22:
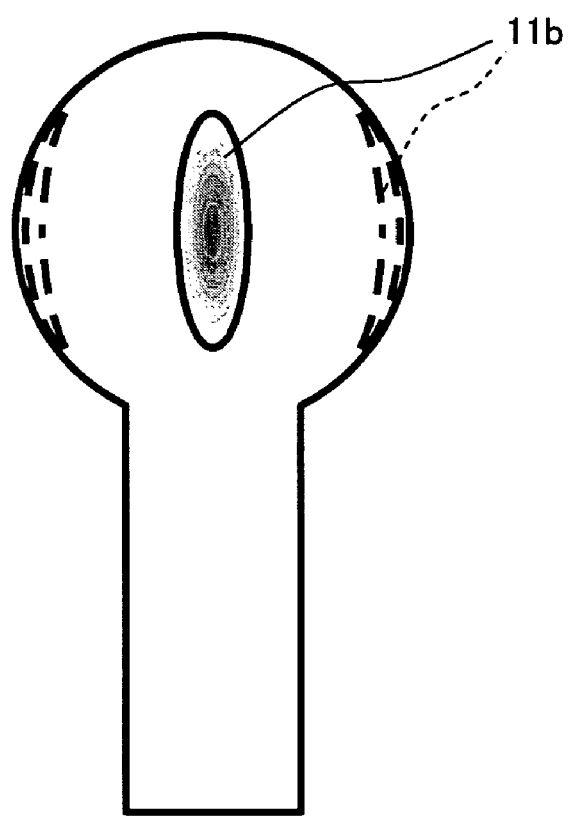

Alternatively, as shown in FIGS. 22(a) (overhead view) and 22(b) (side view), depressed portions 11b may be provided laterally on the column capital part 11. It is preferable also in this case if four of the depressed portions 11b are provided along the four directions N, S, E, and W, respectively. Likewise, it is preferable to provide protruding portions on the inner wall of the cap dome 4 of the cap plate 3, so that the protruding portions respectively fit the depressed portions 11b.

According to the foregoing arrangements, the cap plate 3 rocks along the depressed portions of the column capital part 11. Because the protruding portions in the cap dome 4 respectively fits the depressed portions of the column capital part 11, the cap plate 3 never rotates in the direction parallel to the surface of the substrate 1. Therefore, it is not necessary to provide the rotation constraining columns 8.

As described with reference to FIGS. 5 through 11, in the manufacturing process for the present switch, the cap plate 3 is formed in a self-aligning manner in accordance with the shape of the column capital part 11.

Therefore, if the depressed portions are provided on the column capital part 11, the protruding portions 9 of the cap dome 4 are easily formed in a self-aligning manner in accordance with the shape of the depressed portions of the column capital part 11, in the stage of laminating the second polycrystalline silicon film 32. Therefore, as shown in FIG. 21, depressed portions 9a are formed on top of (outside) the cap dome 4 of the cap plate 3.

Figure 23:
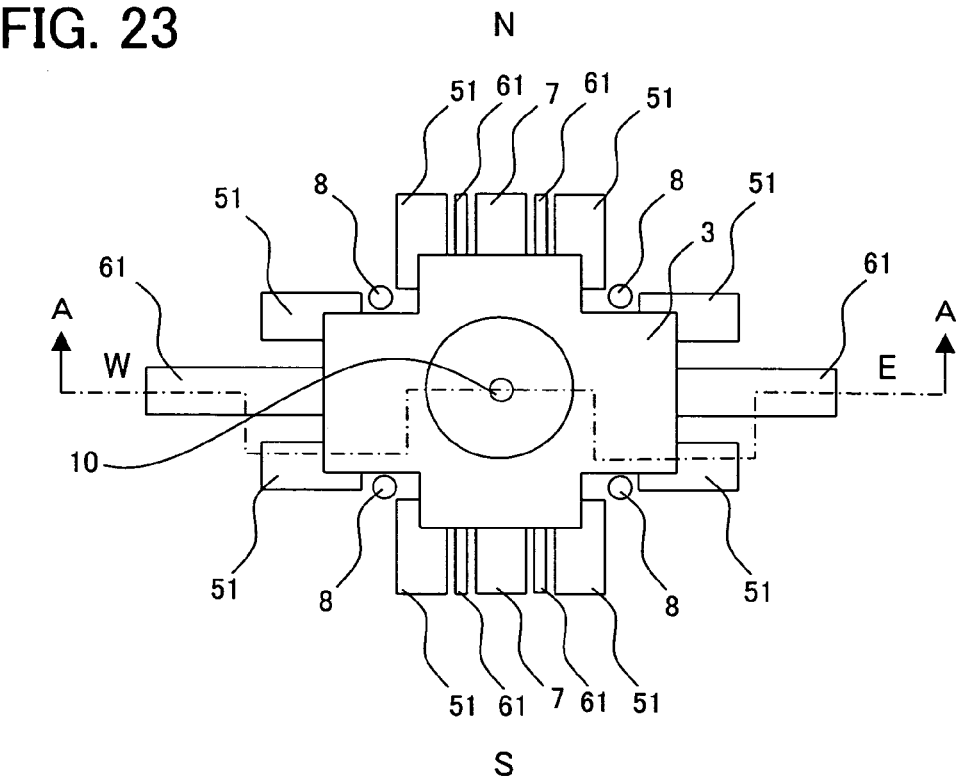
FIG. 23 is an overhead view illustrating the microswitch of FIG. 1, in which a through hole is provided on a cap dome of the cap plate.
Figure 24:
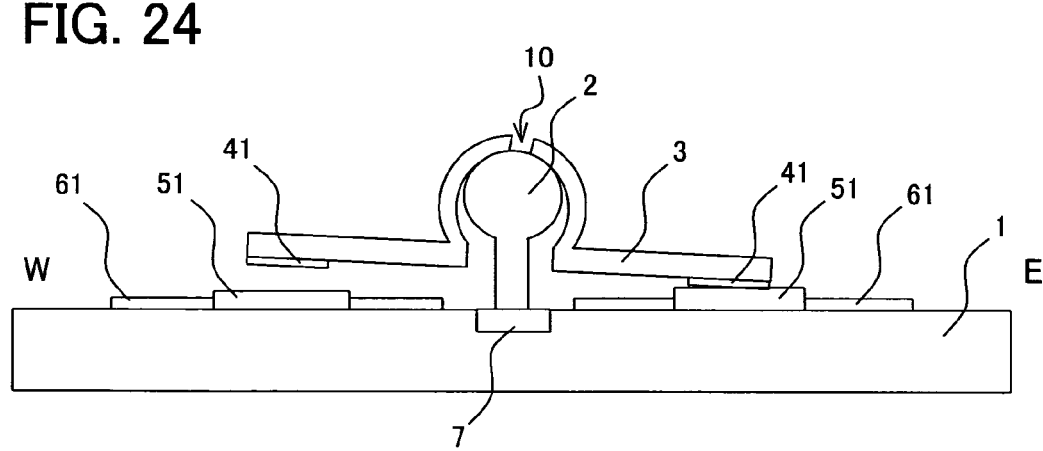
FIG. 24 is a cross-sectional view illustrating the microswitch of FIG. 23, taken along line A—A.

As shown in FIGS. 23 and 24, the present switch may have a through hole 10 provided at a part of the cap dome 4 of the cap plate 3. The through hole 10 can be formed easily when the second insulating film 31 is patterned in forming the cap plate 3.

According to this arrangement, the etchant can be injected through the through hole 10 in the step of removing the second insulating film 31 (the step is shown in FIG. 11). Therefore, the second insulating film (sacrifice film) 31 can be removed efficiently.

In the example shown in FIGS. 23 and 24, one through hole 10 is provided on top of the cap dome 4. However, as long as the rocking of the cap plate 3 is not hampered, the through hole may be provided at any part of the cap plate 3, and the number of the through hole 10 is not limited.

In the present embodiment, only one pair of the signal line electrodes 51 (the pairs are respectively provided in the four directions) are enabled to transmit a signal. However, the present switch may be arranged so that plural pairs of the signal line electrodes 51 provided in plural directions are simultaneously enabled to transmit signals.

Figure 25:
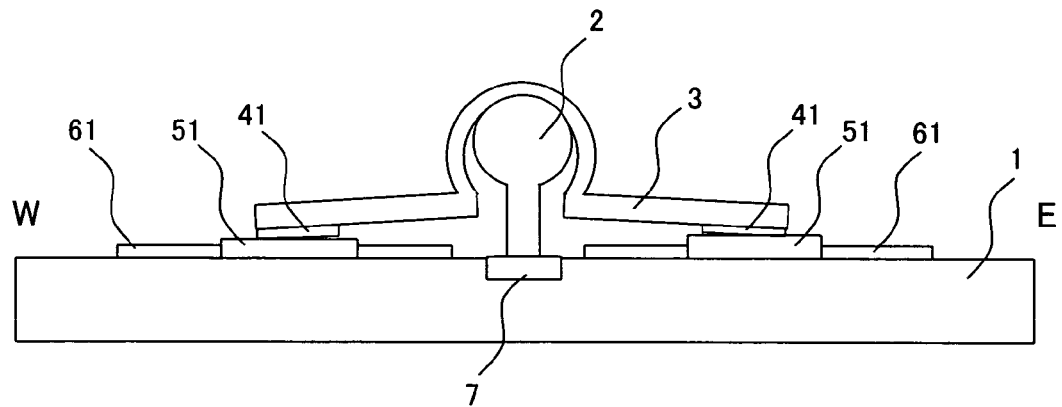
FIG. 25 is an explanatory diagram illustrating the microswitch of FIG. 1 in which more than one contact points are connected.

FIG. 25 is an explanatory diagram illustrating the present switch, where the absorbing electrodes 61 in the E-direction and W-direction are positively charged so that the beams 5 in the E-direction and W-direction respectively contact corresponding pairs of the signal line electrodes 51 (in other words, the switch is in a switching state in which more than one contact points are connected).

Thus, by using the present switch, many contact points can be connected by the single switch. As a result, it is possible to attain more efficient chip area.

Figure 26:
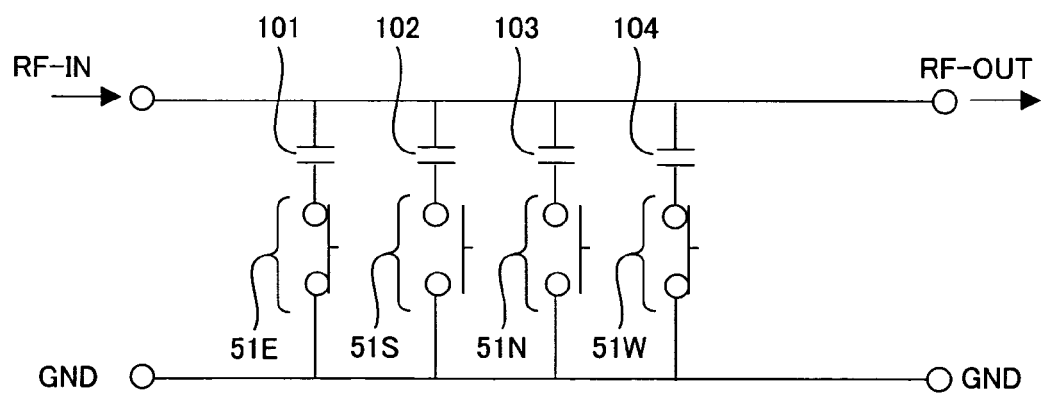
FIG. 26 is an equivalent circuit diagram illustrating an example of an RF circuit using the microswitch of FIG. 25.

FIG. 26 is an equivalent circuit diagram illustrating an example of an RF circuit using the present switch shown in FIG. 25.

In this circuit, a capacitance value is adjusted through a plurality of capacitors connected in parallel.

In this circuit, four capacitors 101 through 104 are connected in parallel on an electric transmission line (from RE-IN to RE-OUT).

In addition, between each of the capacitors and a ground line, a pair of the signal line electrodes 51 (51N through 51W) is provided. The signal line electrodes 51N through 51W are respectively provided in the four directions N, S, E, and W.

The resistance value of the circuit can be adjusted freely by adjusting which and how many of the signal line electrodes 51N through 51W are electrically connected at the same time. This makes it possible to change a characteristic of an RF signal.

Not only the capacitors, but also inductors, resistors, filters, and the like may be provided in the circuit, so that the present switch changes connections among these members. In this way, it is possible to adjust a circuit constant, thereby attaining a desired characteristic.

By using the present switch in such a circuit, it is possible to set the circuit constant to be plural kinds (four kinds) by the single switch. Therefore, an electronic device including the circuit can be miniaturized.

In the present embodiment, the present switch is a switch for switching conduction states of the signal line electrodes 51 by rocking the cap plate 3 (tilting the beams 5).

However, the present switch may be used as an optical switch (optical path switch) for controlling (changing) an optical path of light (e.g. a laser beam) by rocking the cap plate 3. Such an optical switch is used for a transponder and the like for optical communication.

Figure 27:
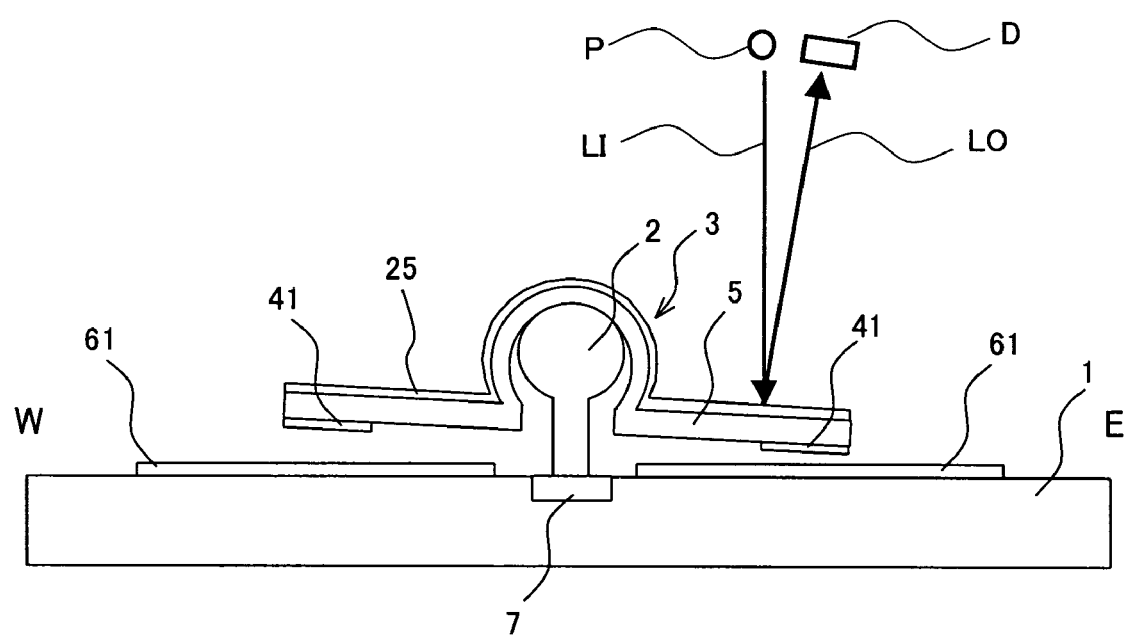
FIG. 27 is an explanatory diagram illustrating a case where the microswitch of FIG. 1 is an optical switch.
Figure 28:
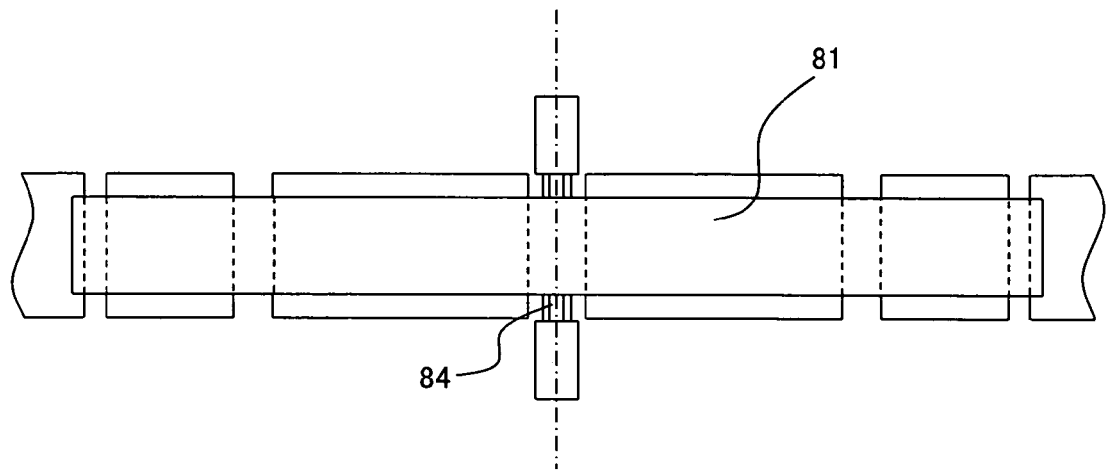
FIG. 28 is an explanatory diagram illustrating a conventional microswitch.
Figure 29:
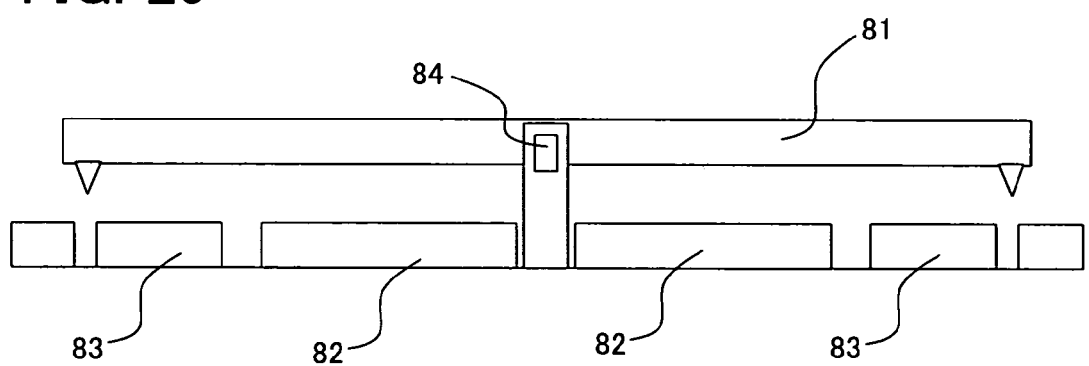
FIG. 29 is an explanatory diagram illustrating the conventional microswitch.

FIG. 27 is an explanatory diagram illustrating an arrangement of the present switch in the case where the present switch is an optical switch.

As shown in FIG. 27, according to this arrangement, an aluminum foil film 33 is laminated on the surface of the cap plate 3. An incident light beam LI radiated from one of light sources P (laser diodes or the like) is reflected on the aluminum foil film 33 on one of the beams 5, so that a reflected light beam LO is outputted.

According to this arrangement, an optical path of each reflected light beam LO changes in accordance with a tilt state of a corresponding one of the beams 5.

According to this arrangement, four light sources P are provided directly above the four beams 5 of the cap plate 3, respectively.

In order to receive four reflected light beams LO, four light-receiving elements (photo detectors or the like) D are provided. Each of the light-receiving elements D is provided in such a position as to receive the reflected light beam LO only when a corresponding one of the beams 5 is attracted to one of the absorbing electrodes 61.

Therefore, when the cap plate 3 is in a state of equilibrium (e.g. when equivalent electrostatic forces are respectively generated at the four absorbing electrodes 61), the reflected light beams LO from the beams 5 are respectively directed to the light sources P. In this case, the optical switch is OFF, because the reflected light beams LO do not reach the light-receiving elements D.

When the contact electrode 41 on one of the beams 5 is electrostatically attracted to one of the absorbing electrodes 61, the cap plate 3 tilts. As a result, one of the reflected light beams LO reaches such one of the light-receiving elements D that corresponds to a tilted one of the beams 5.

Thus, the present switch can switch optical paths of the reflected light beams by using the plurality of beams 5. Therefore, it is possible to control a plurality of optical switching states (i.e to control which of the light beams reaches a corresponding one of the light-receiving elements D) by the single switch.

In the description above, the number of the light sources P and of the light-receiving elements D is four, which corresponds to the number of the beams 5. However, the number of the light sources P and of the light-receiving elements D is not limited to four. Preferably, the number of the light sources P and of the light-receiving elements D is set appropriately (e.g. two or three) in accordance with an intended use.

Moreover, one light source P (beam 5) may correspond to more than one light-receiving elements.

Each of the beams 5 has at least four different states (corresponding to different degrees of tilt), excluding the state of equilibrium. One state is taken when the beam 5 is attracted to one of the absorbing electrodes 61. The other three states are respectively taken when the other beams 5 are attracted to corresponding ones of the absorbing electrodes 61. The number of states increases if plural ones of the beams 5 are attracted to corresponding ones of the absorbing electrodes 61 at the same time. Therefore, by providing a plurality of light-receiving elements D respectively for the states of the beam 5, it is possible to perform more complex switching.

In the present embodiment, the absorbing electrode 61 in one of the four directions is positively charged in order to tilt the cap plate 3. However, electrostatic attracting force is generated between the absorbing electrode 61 and the contact electrode 41 also in the case where the absorbing electrode 61 is negatively charged by lowering the voltage on the absorbing electrode 61. Therefore, the cap plate 3 can be tilted also in this way.

In the present embodiment, one contact electrode 41 is provided on a backside of each of the beams 5, and a pair of signal line electrodes 51 is provided in each direction N, S, W, and E on the substrate 1. However, a plurality of contact points 41 may be provided to each of the beams 5, while correspondingly providing plural pairs of signal line electrodes 51 on the substrate 1. With this arrangement, it is possible to increase the number of contact points per one direction.

In the present embodiment, the cap plate 3 has the four beams 5. However, the number of the beams may be more than four or less than four. The number of the beams may be set freely in accordance with the way the present switch is used.

If the number of the beams 5 is more than four, and the signal line electrodes 51 and the absorbing electrodes 61 are positioned on the substrate 1 in accordance with positions of the beams 5, it is possible to form a switch having a very large number of contact points.

It is not necessary that the beams 5 of the cap plate 3 are positioned symmetrically. For example, two beams may be positioned non-linearly.

In the present embodiment, the substrate 1 is a semiconductor substrate made of silicon. However, the substrate 1 may be an anti-insulating substrate (e.g. a GaAs substrate or a glass substrate), a ceramic substrate, an InP substrate, a GaN substrate, an SiC substrate, or the like.

In the present embodiment, the insulating films 25 and 31 are silicon dioxide films. However, the insulating films 25 and 31 may be (i) inorganic insulating films such as silicon nitride films or oxynitriding silicon films, (ii) silicon oxide films made by spreading phosphorus, boron or the like, or (iii) organic insulating films made of photoresist, polyimide, fluoric resin, or the like.

In the present embodiment, the second insulating film 31 is an inorganic insulating film (silicon dioxide ($SiO_2$)). Therefore, in removing the second insulating film 31, the wet etching method using an aqueous solution of hydrofluoric acid or the dry etching method is employed.

If the second insulating film 31 is an organic insulating film (resist, polyimide, or the like), it is preferable to employ a wet etching method using an organic solution (e.g. acetone) or the dry etching method in removing the second insulating film 31.

In the present embodiment, the supporting column 2 and the cap plate 3 are made of polycrystalline silicon including phosphorus. However, the material of the supporting column 2 and the cap plate 3 may be high melting point metal (tungsten, titanium, molybdenum, or nitride thereof) shaped into a film by the spattering, evaporation, or the like method that allows for formation of a film at low temperatures. That is, the supporting column 2 may be made of metal, and provided on a metal wire formed on the surface of the substrate 1.

If a semiconductor element is formed on a semiconductor substrate, and the present switch is formed thereon so as to integrate (laminate) the semiconductor element and the switch, it is necessary that the present switch be manufactured within a temperature range that does not change a characteristic of the semiconductor element. Therefore, it is preferable to carry out manufacturing steps for the present switch within a temperature range of not higher than 300° C., approximately.

If the supporting column 2 and the cap plate 3 are made of metal and formed by the spattering, evaporation, or the like method, it is possible to perform the manufacturing steps for the present switch at a temperature within the foregoing range.

In the present embodiment, the diffusion layer 7 is formed by performing the ion implantation on such a position of the substrate 1 where the supporting column 2 is to be formed. However, instead of the diffusion layer 7, a low-resistance metal wire may be provided (so as to contact the supporting column 2) on such a position where the supporting column 2 is to be formed, with an end of the metal wire being grounded.

In the present embodiment, the opening 27, which is created in the process (see FIG. 6) of manufacturing the present switch, has a round shape. However, the opening 27 may have a rectangular or polygonal shape. The shape of the opening 27 determines the shape of the leg part 12 of the supporting column 2. It is most preferable if the opening 27 has a round shape.

It is preferable if the present switch is in one of the following states 1 through 3 while idling (waiting), that is, while power is supplied but no switching is required:

State 1: One of the beams 5 is caused to contact (fixed to) a pair of the signal line electrodes 51 by one of the absorbing electrodes 61.

State 2: More than one of the beams 5 are caused to contact corresponding pairs of the signal line electrodes 51 by more than one of the absorbing electrodes 61 (the cap plate 3 may be bent elastically).

State 3: The cap plate 3 is kept in equilibrium (none of the beams 5 is in touch with the signal line electrodes 51) by more than one of the absorbing electrodes 61 that are rotationally symmetrical with respect to the supporting column 2 (the cap plate 3 may be bent elastically or may not be bent).

In the present embodiment, the contact electrode 41 is provided to each of the beams 5. However, it is not necessary to provide the contact electrodes 41, as long as the absorbing electrodes 61 can attract the beams 5 and the beams 5 can electrically connect corresponding pairs of the signal line electrodes 51. In the present embodiment, the rotation constraining columns 8 are provided so that every two adjacent ones of the beams 5 has one of the rotation constraining columns 8 therebetween.

However, the beams 5 may have only one, two, or three rotation constraining column(s) 8 in total so that each one of the rotation constraining column(s) 8 is provided between two adjacent ones of the beams 5.

The electrostatic actuator of the present invention can be described as an electrostatic actuator in which absorbing electrodes provided on a substrate tilt (drive) a rocking plate, the electrostatic actuator including: a supporting column fixed on the substrate; the rocking plate provided on the supporting column; and a plurality of beams provided at respective ends of the rocking plate, the rocking plate being subjected to electrostatic force of the absorbing electrodes.

As described above, an electrostatic actuator of the present invention (hereinafter "the present actuator") is an electrostatic actuator in which absorbing electrodes provided on a substrate electrostatically attract a rocking plate, the electrostatic actuator including: a supporting column fixed on the substrate, the supporting column pivotally supporting the rocking plate; and a plurality of beams provided at respective ends of the rocking plate so as to be subjected to electrostatic force of the absorbing electrodes.

The present actuator is an electrostatic actuator (electrostatic driving microactuator), which is a MEMS technology. The electrostatic actuator is a structure that moves a movable section (the rocking plate) by means of electrostatic force.

Thus, the present actuator has the rocking plate provided above the substrate, and has the absorbing electrodes provided on a surface of the substrate so as to generate electrostatic force. The absorbing electrodes attract (tilt) the rocking plate to the substrate by means of the electrostatic force (attracting force) thereof. In this way, a switching function or the like function is attained.

In particular, the present actuator has the supporting column on the substrate, and the rocking plate is provided on the supporting column, so that the rocking plate is pivoted by (pivotally mounted on) the supporting column.

At respective ends of the rocking plate, the plurality of beams (stick-shaped (beam-shaped) members) are provided, so that the plurality of beams are subjected to the electrostatic force of the absorbing electrodes.

Thus, according to the arrangement of the present actuator, the supporting column pivotally supports the rocking plate. Therefore, tilting directions of the rocking plate (beams), i.e. rocking directions; directions into which the absorbing electrodes attract the rocking plate (beams) to the substrate, can be set freely.

Therefore, according to the present actuator, it is possible to tilt (attract) the rocking plate in a plurality of desired directions, by (i) providing the plurality of beams along a plurality of directions desired by a user, and (ii) providing the absorbing electrodes on the substrate so that the absorbing electrodes respectively correspond to the plurality of beams.

Thus, if the present actuator is used in a microswitch, it is possible to form a microswitch suitable for practical use, in that there is high degree of freedom as to positions and number of substrate contact points.

In the present actuator, the supporting column may include (i) a leg part fixed on the substrate and (ii) a column capital part provided on the leg part.

In this case, it is preferable if the column capital part is wider than the leg part.

Moreover, it is preferable in this case that the rocking plate has a hollow dome part having a plurality of beams at respective ends of the dome part. It is preferable if the dome part engages the column capital part of the supporting column.

In this arrangement, it is preferable if the dome part (pivotally) engages the column capital part of the supporting column in such a manner as to surround (cover) the column capital part.

In this case, the column capital part of the supporting column contacts an inner wall of the dome part so that the rocking plate is pivoted by a contact portion of the column capital part. When the rocking plate tilts, the inner wall of the dome part slides on the column capital part.

According to this arrangement, it is easy to tilt the rocking plate in a desired direction, by using the supporting column as a fulcrum. In addition, it is possible to prevent the rocking plate from being separated (detached) from the supporting column.

If the supporting column has the column capital part and the leg part as described above, it is preferable if the column capital part and the leg part are formed integrally.

If the rocking plate has the dome part, it is preferable if an inner wall of the dome part has a spherical surface shape, and a contact portion of the column capital part of the supporting column has a spherical surface shape, the contact portion being a portion that contacts the dome part.

The term "spherical surface shape" refers to a shape that forms a part of a sphere. With this arrangement, the dome part can easily slide on the column capital part.

If the column capital part is designed to have a spherical surface shape, depressed portions (cut-off portions) may be provided at a part of the column capital part. In this case, it is preferable to provide protruding portions on the inner wall of the dome part (at a contact portion with the column capital part) so that the protruding portions respectively correspond to the depressed portions of the column capital part. It is more preferable if the depressed portions and the protruding portions respectively extend in directions in which the beams extend.

According to this arrangement, the dome part (the rocking plate) tilts only in the directions along which the depressed portions of the column capital part respectively extend. Therefore, it is possible to prevent the rocking plate from rotating in parallel with the substrate.

It is preferable if the number of the beams provided to the present actuator is more than two. It is preferable if the beams extend in different directions.

According to this arrangement, if the present actuator is used in a microswitch, the switch can have more than two contact points. Therefore, it is possible to switch more than two states by the single switch.

In the present actuator, the supporting column pivotally supports the rocking plate. Therefore, there is a possibility that the rocking plate rotates in the direction parallel to the substrate by using the supporting column as an axis of rotation, thereby changing the directions in which the beams respectively extend.

To prevent such rotation, it is preferable if a rotation constraining column for stopping the rotation by contacting the beams is provided on the substrate.

The present actuator is formed by performing semiconductor processing on a single substrate. On the substrate of the present actuator, an absorbing electrode controlling circuit, which is a semiconductor element for controlling (driving) one of the absorbing electrodes of the present actuator, may be formed integrally.

According to this arrangement, it is possible to mount the present actuator and the control circuit on a single chip. Therefore, only small area is required in order to mount the present actuator and the control circuit on a printed circuit. As a result, it is possible to attain miniaturization and cost reduction of an electronic device including the present actuator.

A microswitch of the present invention (the present switch) includes the present actuator, and a pair of signal line electrodes provided on the substrate with respect to each of the beams, so that the pair of signal line electrodes are electrically connected with one another through one of the beams when said one of the beams is attracted (tilted) to the substrate.

Because the present switch includes the present actuator, the present switch is a microswitch that is suitable for practical use, in that there is high degree of freedom as to positions and number of substrate contact points.

If the present switch is used in an electronic device such as a portable phone, it is possible to switch many states by the single switch. Therefore, it is possible to realize a small, low-cost electronic device.

The pair of signal line electrodes of the present switch are provided on the substrate in accordance with the number and positions of the beams of the rocking plate (therefore, there are plural pairs of signal line electrodes).

The present switch may be arranged so that the pair of signal line electrodes are electrically connected with one another when the pair of signal line electrodes are short-circuited by contacting one of the beams (conductive).

If a radio frequency signal is transmitted between the pair of signal line electrodes, it is not necessary to cause contact between one of the beams and the pair of signal line electrodes. In this case, a dielectric material may be provided to at least one of (i) a contact portion of the pair of signal line electrodes with one of the beams and (ii) a contact portion of one of the beams with the pair of electrodes.

Even if no dielectric material is provided, it is possible to transmit a signal if the distance between the pair of signal line electrodes and one of the beams is very short.

In this case, a stopper may be provided on the substrate with respect to each of the beams, so that the stopper limits a driven range (degree of tilt) of a corresponding one of the beams, thereby creating a gap between the corresponding one of the beams and the pair of signal line electrodes when the corresponding one of the beams is attracted to the substrate. In other words, a stopper for preventing direct contact between a corresponding one of the beams and the pair of signal line electrodes may be provided.

According to this arrangement, the beams do not contact the signal line electrodes directly. Therefore, it is possible to attain small loss and high isolation.

Because the thickness of the dielectric material (or the size of the gap) between the pair of signal line electrodes and the corresponding one of the beams determines capacitance value, accuracy of the thickness of the dielectric material (or the size of the gap) is important.

The capacitance value needs to be a value suitable for a switching characteristic at a frequency of the signal transmitted. Therefore, the capacitance value varies according to the frequency.

The present actuator may be used to form a micro optical switch. In the micro optical switch, the present actuator is used to change an optical path of a laser beam or the like. For example, such a micro optical switch may include the electrostatic actuator having light reflecting films on the plurality of beams, respectively; a light source for radiating light onto the plurality of beams; and a light-receiving element for receiving reflected light from the light reflecting films.

If such a micro optical switch is used in an electronic device, many states can be switched by the single switch. Therefore, it is possible to realize a small, low-cost electronic device.

As described above, in the present actuator, the absorbing electrodes attract the beams of the rocking plate. The present actuator may be such that only one of the beams is tilted at a time to the substrate by one of the absorbing electrodes.

On the other hand, the present actuator may be driven in such a manner that more than one of the beams are tilted at the same time by more than one of the absorbing electrodes. In this case, a part of the rocking plate may be deformed elastically. If the present actuator is used in a switch, it is possible to (electrically) connect more than one contact points (more than one pair of signal line electrodes).

The present actuator can be manufactured through the following first to fifth steps.

First, the supporting column and the absorbing electrodes are formed on the substrate (the first step). Then, on the entire surface of the substrate, the entire surface including the supporting column, a sacrifice film (sacrifice layer) made of insulating film or the like is formed (the second step).

Thereafter, on the sacrifice film, a conductive film made of polycrystalline silicon film or the like is formed (the third step). The conductive film is then patterned, so as to form the rocking plate (the fourth step). Finally, the sacrifice film, which is provided under the rocking plate, is removed (the fifth step).

In this way, the present actuator can be manufactured easily by performing semiconductor processing on a single substrate. Therefore, it is possible to simplify the manufacturing process, and to reduce the size of the present switch easily.

In the forth step, a through hole may be provided at a part of the rocking plate.

After the fourth step, the sacrifice film is removed usually by etching. If the rocking plate has the through hole, it is possible to inject the etchant through the through hole in performing the etching. Therefore, it is possible to remove the sacrifice film efficiently.

In this case, the through hole is provided at the rocking plate of the present actuator manufactured.

It can be said that the seesaw type micro switch of publication 2 is arranged as follows. The beams 81 are respectively provided on the right and on the left, with the column 84 at the center. Each of the beams 84 has a contact point. On the substrate, which is opposed to the beams 81, the electrostatic force applying electrodes 82 and the contact points 83 are provided. When an electric field is applied to one of the electrostatic force applying electrodes 82, which are provided on the substrate, a corresponding one of the beams 81 is attracted to the substrate by electrostatic force. In this way, switching operation for connecting one of the electrodes 83 provided on the substrate and a corresponding one of the electrodes provided on the beams 81 is performed. According to this structure, the beams 81 can only perform up-and-down movement with respect to the substrate, with the column-shaped supporting leg at the center. Meanwhile, the contact points are respectively provided on the beams, which extend rightward and leftward from the supporting leg. Therefore, it is difficult to increase the number of the contact points.

It can be said that the present switch is a microswitch using an electrostatic actuator that absorbs beams to the substrate by electrostatic driving of the present invention, and that has many contact points. The arrangement of the present switch can be described as follows. On the substrate 1, the supporting column 2 is provided. The supporting column 2 is narrow on a side contacting the substrate 1, and is wide on an upper side. On the substrate 1, the diffusion layer 7 is provided. The supporting column 2 is provided on the diffusion layer 7. On the supporting column 2, the cap plate 3 is provided in such a manner as to cover the supporting column 2. On a bottom side of each of the beams 81, a low-resistance wire, which is to be the contact electrode (contact point) 41, is provided. On the surface of the substrate 1, which is opposed to the contact electrode 41, the signal line electrodes 51 and the absorbing electrodes 61 are provided. When one of the absorbing electrodes (electrostatic force applying electrodes) 61 is charged positively, electrostatic force is generated between that one of the absorbing electrodes 61 and a corresponding one of the beams 5. Then, the corresponding one of the beams 5 is absorbed to the substrate 1. As a result, the contact electrode 41 on the corresponding one of the beams 5 and a corresponding pair of the signal line electrodes 51 on the substrate 1 are connected. The same result can be attained by negatively charging one of the absorbing electrodes 61. In order to prevent the cap plate 3 from moving in an unintended direction, the rotation constraining columns 8 are provided on the substrate 1. Because the beams 5 are not fixed, the rotation constraining columns 8 are provided outside a movable range of the beams 5, so that directions of movement of the beams 5 will not become unstable when the beams 5 are driven. According to this arrangement, the beams 5 can perform up-and-down movement without being misaligned with the electrodes on the substrate.

The present switch may be such that the supporting column is made of metal, and is provided on a metal wire formed on the surface of the substrate, and that the beams are made of metal that is nitride of high melting point metal (e.g. tungsten). In particular, if the substrate is a semiconductor substrate, a semiconductor element is formed on the substrate, and the present switch is laminated on the semiconductor element, it is necessary that the present switch be formed at temperatures within a range that do not change a characteristic of the semiconductor element. Specifically, it is necessary that the manufacturing steps be performed at temperatures not higher than 300° C. If, in view of the circumstance, the supporting column and the beams are made of metal by spattering or the like method, it is possible to integrate and laminate the present switch with the semiconductor element. Although the diffusion layer 7 is provided on the substrate 1 so as to capture charge of the supporting column 2, the same effect can be attained by using a low-resistance metal wire.

At the time of idling, the cap plate 3 may be in either one of the following states: (1) a state in which the cap plate 3 is always fixed by a bias at one point, (2) a state in which a voltage is applied to more than one of the absorbing electrodes 61, so that more than one of the beams are absorbed and bent to the substrate, and (3) a state in which a voltage not so high as to bent the beams is uniformly applied to symmetrically provided ones of the absorbing electrodes 61 so that the beams become parallel.

In the present switch, the contact electrodes 41 of the beams 5, the contact electrodes 41 being opposed to the signal line electrodes 51, contact the signal line electrodes 51, whereas the contact electrodes 41 do not contact the absorbing electrodes 61 (because there are gaps between the contact electrodes 41 and the absorbing electrodes 61. The present switch attracts the beams to the substrate by the electrostatic force generated between the absorbing electrodes 61 and the contact electrodes 41. If the contact electrodes 41 contact the absorbing electrodes 61, the electrostatic force disappears. If the present switch is an RF switch, connection can be established with a structure having capacitors sandwiched between the contact electrodes 41 and the absorbing electrodes 61. In this case, accuracy of the gap therebetween is important. That is, the gap= the thickness of the dielectric material= the capacitance value. The capacitance value needs to be a value suitable for a switching characteristic at a desired frequency. Therefore, the capacitance value varies according to the frequency. In connecting metal with metal (DC-DC connection), there are problems of abrasion and adhesion of contact points. These problems do not occur if the dielectric material is sandwiched therebetween. This enhances reliability.

Concerning the application example of the present switch shown in FIG. 19, a digital portable phone adjusts power of outgoing radio waves in accordance with a distance from an intermediary station. That is, the radio waves are transmitted at low power when the distance is short, and at high power when the distance is long. There are a plurality of antennas, and the switch is used to switch to appropriate antennas in accordance with the output. A radio-frequency-use power amplifier is used both at the time of transmission and reception. The radio-frequency-use power amplifier is connected to different circuits at the time of transmission and at the time of reception, and which circuit to connect the radio-frequency-use power amplifier to is switched by a switch. The switching is usually performed by a semiconductor switch. By using the present switch, switching can be performed with high isolation and small loss. As a result, low power consumption can be attained.

Concerning the arrangement of FIG. 26, in the case where a desired characteristic is attained by combining several circuit constants, a plurality of circuits can be switched by a single switching operation, if necessary wires are provided and the present switch is used. As a result, miniaturization can be attained. In the case of the microswitch of the present embodiment, the supporting column 2, which is the fulcrum of the beams 5, is a round column. Therefore, the fulcrum of the beams 5 is half-fixed. This allows for the movement of the cap plate 3 without increasing a structural driving voltage. Moreover, because spring of the beams is not utilized, influences to structural damages to and changes over time of the beams 5 can be reduced. This enhances long-term reliability. In addition, the supporting column 2 has a constricted part (that is, the column capital part 11 is wider than the leg part 12). Therefore, the cap plate 3 will not be detached from the supporting column 2 even if the substrate 1 is turned over.

The present invention can be described as the following first through ninth electrostatic actuators, first through third electrostatic actuator switches, first wireless communication device, first micro optical path switch, and method of moving first and second electrostatic actuators.

The first electrostatic actuator has fixed electrodes and a supporting column on a substrate, and has movable electrodes on the supporting column. The second electrostatic actuator is the first electrostatic actuator, wherein the supporting column has a width difference so as to have a constricted part, and the constricted part is covered with the movable electrodes, which are distanced from the substrate, the movable electrodes using the supporting column as a fulcrum.

The third electrostatic actuator is the first electrostatic actuator, wherein the supporting column has a width difference (narrow at a portion close to the substrate and wide at an upper portion) so as to have a constricted part, and the upper portion (wide portion) of the supporting column is covered with movable electrodes distanced from the substrate, the movable electrodes using the supporting column as a fulcrum. The fourth electrostatic actuator is one of the first through third electrostatic actuators, wherein the wide portion of the supporting column has a spherical shape. The fifth electrostatic actuator is the fourth electrostatic actuator, wherein a depressed portion is provided at a part of the spherical portion.

The sixth electrostatic actuator is one of the first through fifth electrostatic actuators, wherein the movable electrodes are directed in more than two different directions, the supporting column being at a center. The seventh electrostatic actuator is one of the first through sixth electrostatic actuators, wherein a through hole is provided at such a part of the movable electrodes that overlaps the supporting column. The eighth electrostatic actuator is one of the first through seventh electrostatic actuators, wherein a column higher than a movable distance of the movable electrodes is provided outside a movable range of the movable electrodes.

The first electrostatic actuator switch is arranged so that low-resistance connecting electrodes are respectively provided at backsides of the movable electrodes, and on the substrate, which is opposed to the movable electrodes, (i) fixed electrodes for applying electrostatic force and (ii) connecting electrodes to be connected to the low-resistance electrodes of the movable electrodes are provided. The second electrostatic actuator switch is arranged so that a dielectric film is provided on a surface of one of or both of (i) the low-resistance electrodes respectively provided on the backsides of the movable electrodes and (ii) the connecting electrodes on the substrate. The third electrostatic actuator switch is the first electrostatic actuator switch, wherein an electrode higher than the substrate or the connecting electrodes of the movable electrodes are provided, so as to create a gap that prevents contact of the connecting electrodes.

The ninth electrostatic actuator is arranged so that the substrate of one of the first through eighth electrostatic actuators and one of the first through third electrostatic actuator switches has a signal processing circuit.

The first wireless communication device has one of the first through ninth electrostatic actuators and one of the first through third electrostatic actuator switches. The first micro optical path switch has light reflecting films respectively provided to the surfaces of the movable electrodes of one of the first through ninth electrostatic actuators and one of the first through third electrostatic actuator switches.

The method of moving the first electrostatic actuator is a method of moving an electrostatic actuator in which the movable electrodes of one of the first through ninth electrostatic actuator switches, one of the first through third electrostatic actuator switches, the first wireless communication device, and the first micro optical path switch are provided in more than two different directions, the supporting column 2 being at a center, the method including the step of applying charge to more than one of the fixed electrodes (which is for applying electrostatic force) simultaneously so as to connect more than one connecting points.

According the first through ninth electrostatic actuators, the first through third electrostatic actuator switches, the first wireless communication device, the first micro optical path switch, and the method of driving one of the first and second electrostatic actuators, the beams (movable electrodes) of the present invention are not fixed. The amount of charge required to move the beams is the amount required to attract the beams. Therefore, it is possible to drive the beams at a low voltage. Moreover, because spring of the beams is not utilized, high-speed operation is possible. In addition, because the beams can be driven at a low voltage, it is not necessary to provide a circuit for generating a high voltage, in combining the circuit with another circuit. Therefore, it is possible to simplify the circuit. If the present switch is used in a radio frequency circuit, input loss is reduced, and an isolation characteristic is improved. As a result, power consumption of the circuit becomes low. Furthermore, according to the microswitch of the present invention, many contact points can be provided. This allows for switching a plurality of signal lines or the like by the single switch. Therefore, it is possible to attain more efficient installation area, thereby attaining lower cost. If the present switch is an optical switch, a plurality of optical paths can be switched at a high speed by the single switch. Therefore, it is possible to improve performance of an optical signal processing circuit.

It can be said that an object of the present invention is to provide a structure of a MEMS switch that has many contact points, operates at a low voltage, and has high mechanical reliability. The beams of the present invention are formed in a self-aligning manner on the supporting column, which is provided on the substrate and has the constricted portion. To perform switching operation, the beams are caused to move up and down on the supporting column, which functions as a fulcrum. According to this structure, the beams will not be detached even if the switch is turned over. The beams of the present invention may be arranged in a shape of wings spread in many directions, the supporting column being at the center. By providing a contact point at each beam, beams having many contact points can be formed. Therefore, it is possible to miniaturize members. Moreover, the beams of the present invention are moved in the half-fixed state. Therefore, it is possible to drive the beams at a low voltage. Furthermore, because the beams are not significantly deformed by the movement thereof, deformation of the beams is moderate even if the beams are driven for a long time. Therefore, long-term reliability is enhanced.

It can be said that the microswitch of the present invention includes beams; connecting electrodes respectively provided on the beams; electrostatic force applying electrodes provided on a semiconductor substrate; a semiconductor element provided on the semiconductor substrate; and electrical connecting points drawn from the semiconductor element, switching operation for connecting contact points on the substrate and contact points on the beams being performed by applying charge to the electrostatic force generating electrodes on the semiconductor substrate so as to generate electrostatic force between the beams and the electrostatic force generating electrodes, thereby attracting the beams to the semiconductor substrate. If such a microswitch is used for switching antennas for radio frequency communication or for switching transmission and reception, circuits can be switched with small loss. Therefore, power consumption of a device can be reduced. If the microswitch of present invention is an optical switch, it is possible to polarize light in many directions by the single switch.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An electrostatic actuator in which absorbing electrodes provided on a substrate electrostatically attract a rocking plate, the electrostatic actuator including:
   a supporting column fixed on the substrate, the supporting column pivotally supporting the rocking plate to allow more than one degree of pivotal freedom, and the supporting column has a leg part fixed on the substrate and a column capital part provided on the leg part, the column capital part being wider than the leg part;
   a plurality of beams provided at respective ends of the rocking plate so as to be subjected to electrostatic force of the absorbing electrodes;
   the rocking plate has a hollow dome part having the plurality of beams at respective ends of the dome part; and
   the dome part is engaged with the column capital part of the supporting column.

2. The electrostatic actuator as set forth in claim 1, wherein:
   an inner wall of the dome part has a spherical surface shape, and a contact portion of the column capital part of the supporting column has a spherical surface shape, the contact portion being a portion that contacts the dome part.

3. The electrostatic actuator as set forth in claim 2, wherein:
   depressed portions are provided on a part of the column capital part; and
   protruding portions are provided on the inner wall of the dome part, so that the protruding portions respectively correspond to the depressed portions of the column capital part.

4. The electrostatic actuator as set forth in claim 1, wherein:
   the number of the plurality of beams is more than two; and
   the plurality of beams extend in different directions.

5. An electrostatic actuator in which absorbing electrodes provided on a substrate electrostatically attract a rocking plate, the electrostatic actuator comprising:
   a supporting column fixed on the substrate, the supporting column pivotally supporting the rocking plate to allow more than one degree of pivotal freedom;
   a plurality of beams provided at respective ends of the rocking plate so as to be subjected to electrostatic force of the absorbing electrodes; and
   a rotation constraining column provided on the substrate, the rotation constraining column being for contacting the beams so as to prevent the rocking plate from rotating in parallel with the substrate.

6. An electrostatic actuator as set forth in claim 1, further comprising:
an absorbing electrode control circuit provided on the substrate, the absorbing electrode control circuit controlling one of the absorbing electrodes.

7. A microswitch, comprising:
the electrostatic actuator as set forth in claim 1; and
a pair of signal line electrodes provided on the substrate with respect to each of the beams, so that the pair of signal line electrodes are electrically connected with one another through one of the beams when said one of the beams is attracted to the substrate.

8. A microswitch as set forth in claim 7, further comprising:
a dielectric material provided to at least one of (i) a contact portion of the pair of signal line electrodes with said one of the beams and (ii) a contact portion of said one of the beams with the pair of electrodes.

9. A microswitch as set forth in claim 7, further comprising:
a stopper provided on the substrate with respect to each of the beams, the stopper limiting a driven range of said one of the beams so that a gap is created between said one of the beams and the pair of signal line electrodes when said one of the beams is attracted to the substrate.

10. A micro optical switch, comprising:
the electrostatic actuator as set forth in claim 1, the electrostatic actuator having light reflecting films on the plurality of beams, respectively;
a light source for radiating light onto the plurality of beams; and
a light-receiving element for receiving reflected light from the light reflecting films.

11. An electronic device, comprising: the microswitch as set forth in claim 7.

12. An electronic device, comprising: the micro optical switch as set forth in claim 10.

* * * * *